US012574192B2

(12) United States Patent
Liu et al.

(10) Patent No.: US 12,574,192 B2
(45) Date of Patent: Mar. 10, 2026

(54) SIMULTANEOUS TRANSMISSION CONFIGUTATION INDICATION (TCI) STATE ACTIVATION FOR UPLINK (UL) AND DOWNLINK (DL)

(71) Applicant: LENOVO (BEIJING) LIMITED, Beijing (CN)

(72) Inventors: Bingchao Liu, Beijing (CN); Chenxi Zhu, Fairfax, VA (US); Wei Ling, Beijing (CN); Yi Zhang, Beijing (CN); Lingling Xiao, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 365 days.

(21) Appl. No.: 18/248,222

(22) PCT Filed: Oct. 9, 2020

(86) PCT No.: PCT/CN2020/119943
§ 371 (c)(1),
(2) Date: Apr. 6, 2023

(87) PCT Pub. No.: WO2022/073189
PCT Pub. Date: Apr. 14, 2022

(65) Prior Publication Data
US 2023/0370238 A1       Nov. 16, 2023

(51) Int. Cl.
H04L 5/00          (2006.01)
H04W 72/231       (2023.01)

(52) U.S. Cl.
CPC ............ H04L 5/0094 (2013.01); H04L 5/001 (2013.01); H04L 5/0048 (2013.01); H04L 5/0053 (2013.01); H04W 72/231 (2023.01)

(58) Field of Classification Search
CPC ..... H04L 5/0094; H04L 5/001; H04L 5/0048; H04L 5/0053; H04W 72/231
See application file for complete search history.

(56) References Cited

U.S. PATENT DOCUMENTS

2020/0136715 A1      4/2020   Kiran et al.
2021/0014931 A1*    1/2021   Noh ...................... H04L 5/0035
(Continued)

FOREIGN PATENT DOCUMENTS

CN          109076560 A      12/2018
CN          109802787 A        5/2019
CN          111106907 A        5/2020

OTHER PUBLICATIONS

Lenovo et al., "Enhancements on Multi-beam Operation", 3GPP TSG RAN WG1#102-e, e-meeting, Aug. 17-Aug. 28, 2020, R1-2005820 (Year: 2020).*

(Continued)

*Primary Examiner* — Joseph A Bednash
(74) *Attorney, Agent, or Firm* — AMPACC Law Group, PLLC

(57)                    ABSTRACT

Methods and apparatuses for simultaneously activating DL TCI states and UL TCI states are disclosed. A method comprises transmitting one MAC CE that can simultaneously activate DL TCI states and UL TCI states, wherein the one MAC CE includes TCI state IDs that can be indicated as DL TCI state IDs identifying the DL TCI states to be activated and/or UL TCI state IDs identifying the UL TCI states to be activated.

17 Claims, 39 Drawing Sheets

| R | Serving Cell ID | BWP ID | Oct 1 |
|---|---|---|---|
| D/U 00 | TCI state ID 0 | | Oct 2 |
| D/U 01 | TCI state ID 0 | | Oct 3 |
| | ... | | |
| D/U N0 | TCI state ID N | | Oct M-1 |
| D/U N1 | TCI state ID N | | Oct M |

(56)     References Cited

U.S. PATENT DOCUMENTS

2023/0254877 A1 *   8/2023   Matsumura ........... H04L 5/0051
                                                      370/329
2023/0300851 A1 *   9/2023   Zhou ................... H04W 72/231
                                                      370/329

OTHER PUBLICATIONS

Qualcomm Incorporated "Enhanced TCI States Activation/
Deactivation PDSCH MAC CE for Multi-TRP" 3GPP TSG-RAN
WG2 Meeting #107bis R2-1913407, Oct. 18, 2019; pp. 1-3.
Moderator (Samsung) "Moderator summary#2 for multi-beam enhance-
ment: proposal categorization" 3GPP TSG RAN WG1 #102-e
R1-2007189, Aug. 28, 2020; pp. 1-27.
International Search Report and Written Opinion dated Jul. 15, 2021
for International Application No. PCT/CN2020/119943.

* cited by examiner

| R | Serving Cell ID | BWP ID | Oct 1 |
|---|---|---|---|
| D/U 00 | TCI state ID 0 | | Oct 2 |
| D/U 01 | TCI state ID 0 | | Oct 3 |
| ... | | | |
| D/U N0 | TCI state ID N | | Oct M-1 |
| D/U N1 | TCI state ID N | | Oct M |

Figure 1(a)

| R | Serving Cell ID | BWP ID | Oct 1 |
|---|---|---|---|
| 0 | TCI state ID 0 = 0000010 | | Oct 2 |
| 1 | TCI state ID 0 = 0000011 | | Oct 3 |
| 0 | TCI state ID 1 = 0000110 | | Oct 4 |
| 1 | TCI state ID 1 = 0000111 | | Oct 5 |
| 0 | TCI state ID 2 = 0001010 | | Oct 6 |
| 1 | TCI state ID 2 = 0001110 | | Oct 7 |
| 0 | TCI state ID 3 = 0010010 | | Oct 8 |
| 1 | TCI state ID 3 = 0011010 | | Oct 9 |
| 0 | TCI state ID 4 = 0011010 | | Oct 10 |
| 1 | TCI state ID 4 = 0011110 | | Oct 11 |
| 0 | TCI state ID 5 = 0110010 | | Oct 12 |
| 1 | TCI state ID 5 = 0111010 | | Oct 13 |
| 0 | TCI state ID 6 = 1101110 | | Oct 14 |
| 1 | TCI state ID 6 = 1111001 | | Oct 15 |
| 0 | TCI state ID 7 = 1101111 | | Oct 16 |
| 1 | TCI state ID 7 = 1111011 | | Oct 17 |

Figure 1(b)

| R | Serving Cell ID | BWP ID | Oct 1 |
|---|---|---|---|
| 0 | TCI state ID 0 | | Oct 2 |
| 0 | TCI state ID 1 | | Oct 3 |
| 0 | TCI state ID 2 | | Oct 4 |
| 0 | TCI state ID 3 | | Oct 5 |
| 0 | TCI state ID 4 | | Oct 6 |
| 0 | TCI state ID 5 | | Oct 7 |
| 0 | TCI state ID 6 | | Oct 8 |
| 0 | TCI state ID 7 | | Oct 9 |
| 1 | TCI state ID 0 | | Oct 10 |
| 1 | TCI state ID 1 | | Oct 11 |
| 1 | TCI state ID 2 | | Oct 12 |
| 1 | TCI state ID 3 | | Oct 13 |
| 1 | TCI state ID 4 | | Oct 14 |
| 1 | TCI state ID 5 | | Oct 15 |
| 1 | TCI state ID 6 | | Oct 16 |
| 1 | TCI state ID 7 | | Oct 17 |

Figure 1(c)

| R | Serving Cell ID | | | BWP ID | Oct 1 |
|---|---|---|---|---|---|
| D/U 00 | TCI state ID 0 | | | | Oct 2 |
| D/U 01 | TCI state ID 0 | | | | Oct 3 |
| R | R | R | Power Control Parameter Set ID 0 (optionally presented when D/U 01 =1) | | Oct 4 |
| ... | | | | | |
| D/U N0 | TCI state ID N | | | | Oct M-2 |
| R | R | R | Power Control Parameter Set ID N (optionally presented when D/U N0=1) | | Oct M-1 |
| D/U N1 | TCI state ID N | | | | Oct M |

Figure 2(a)

| | | | | | | |
|---|---|---|---|---|---|---|
| R | Serving Cell ID | | | | BWP ID | Oct 1 |
| D/U 00 | TCI state ID 0 | | | | | Oct 2 |
| R | R | R | PL-RS ID 0 (optionally presented when D/U 00 =1) | | | Oct 3 |
| D/U 01 | TCI state ID 0 | | | | | Oct 4 |
| ... | | | | | | |
| D/U N0 | TCI state ID N | | | | | Oct M-2 |
| D/U N1 | TCI state ID N | | | | | Oct M-1 |
| R | R | R | PL-RS ID N (optionally presented when D/U N1=1) | | | Oct M |

Figure 2(b)

| | | | | |
|---|---|---|---|---|
| R | Serving Cell ID | | BWP ID | Oct 1 |
| 0 | TCI state ID 0 | | | Oct 2 |
| 1 | TCI state ID 1 | | | Oct 3 |
| R | R | R | Power Control Parameter Set ID 1 | Oct 4 |
| 1 | TCI state ID 2 | | | Oct 5 |
| R | R | R | Power Control Parameter Set ID 2 | Oct 6 |
| 0 | TCI state ID 3 | | | Oct 7 |
| 0 | TCI state ID 4 | | | Oct 8 |
| 0 | TCI state ID 5 | | | Oct 9 |
| 1 | TCI state ID 6 | | | Oct 10 |
| R | R | R | Power Control Parameter Set ID 6 | Oct 11 |
| 0 | TCI state ID 7 | | | Oct 12 |
| 1 | TCI state ID 0 | | | Oct 13 |
| R | R | R | Power Control Parameter Set ID 0 | Oct 14 |
| 0 | TCI state ID 1 | | | Oct 15 |
| 0 | TCI state ID 2 | | | Oct 16 |
| 1 | TCI state ID 3 | | | Oct 17 |
| R | R | R | Power Control Parameter Set ID 3 | Oct 18 |
| 1 | TCI state ID 4 | | | Oct 19 |
| R | R | R | Power Control Parameter Set ID 4 | Oct 20 |
| 1 | TCI state ID 5 | | | Oct 21 |
| R | R | R | Power Control Parameter Set ID 5 | Oct 22 |
| 0 | TCI state ID 6 | | | Oct 23 |
| 1 | TCI state ID 7 | | | Oct 24 |
| R | R | R | Power Control Parameter Set ID 7 | Oct 25 |

Figure 2(c)

| CORE SET Pool ID | Serving Cell ID | BWP ID | Oct 1 |
|---|---|---|---|
| D/U 00 | TCI state ID 0 | | Oct 2 |
| D/U 01 | TCI state ID 0 | | Oct 3 |
| | ... | | |
| D/U N0 | TCI state ID N | | Oct M-1 |
| D/U N1 | TCI state ID N | | Oct M |

Figure 3(a)

| CORE SET Pool ID | Serving Cell ID | | BWP ID | Oct 1 |
|---|---|---|---|---|
| D/U 00 | TCI state ID 0 | | | Oct 2 |
| D/U 01 | TCI state ID 0 | | | Oct 3 |
| R | R | R | Power Control Parameter Set 0 (optionally presented when D/U 01 =1) | Oct 4 |
| ... | | | | |
| D/U N0 | TCI state ID N | | | Oct M-2 |
| R | R | R | Power Control Parameter Set N (optionally presented when D/U N0=1) | Oct M-1 |
| D/U N1 | TCI state ID N | | | Oct M |

Figure 3(b)

| | | | |
|---|---|---|---|
| R | Serving Cell ID | BWP ID | Oct 1 |
| $DC_0$ | DL TCI state ID 01 | | Oct 2 |
| R | DL TCI state ID 02 | | Oct 3 |
| $UC_0$ | UL TCI state ID 01 | | Oct 4 |
| R | UL TCI state ID 02 | | Oct 5 |
| ... | | | |
| $DC_N$ | DL TCI state ID N1 | | Oct M-3 |
| R | DL TCI state ID N2 | | Oct M-2 |
| $UC_N$ | UL TCI state ID N1 | | Oct M-1 |
| R | UL TCI state ID N2 | | Oct M |

Figure 4(a)

| | | | |
|---|---|---|---|
| R | Serving Cell ID | BWP ID | Oct 1 |
| $DC_0$ | DL TCI state ID 01 | | Oct 2 |
| R | DL TCI state ID 02 | | Oct 3 |
| ... | | | |
| $DC_N$ | DL TCI state ID N1 | | Oct M-1 |
| R | DL TCI state ID N2 | | Oct M |
| $UC_0$ | UL TCI state ID 01 | | Oct M+1 |
| R | UL TCI state ID 02 | | Oct M+2 |
| ... | | | |
| $UC_N$ | UL TCI state ID N1 | | Oct 2M-2 |
| R | UL TCI state ID N2 | | Oct 2M-1 |

Figure 4(b)

| | | | | |
|---|---|---|---|---|
| R | Serving Cell ID | | BWP ID | Oct 1 |
| $DC_0$ | DL TCI state ID 01 | | | Oct 2 |
| R | DL TCI state ID 02 | | | Oct 3 |
| $UC_0$ | UL TCI state ID 01 | | | Oct 4 |
| R | R | R | Power Control Parameter Set ID 01 | Oct 5 |
| R | UL TCI state ID 02 | | | Oct 6 |
| R | R | R | Power Control Parameter Set ID 02 | Oct 7 |
| ... | | | | |
| $DC_N$ | DL TCI state ID N1 | | | Oct M-5 |
| R | DL TCI state ID N2 | | | Oct M-4 |
| $UC_N$ | UL TCI state ID N1 | | | Oct M-3 |
| R | R | R | Power Control Parameter Set ID N1 | Oct M-2 |
| R | UL TCI state ID 02 | | | Oct M-1 |
| R | R | R | Power Control Parameter Set ID N2 | Oct M |

Figure 4(c)

| | | | | |
|---|---|---|---|---|
| R | Serving Cell ID | | BWP ID | Oct 1 |
| DC$_0$ | DL TCI state ID 01 | | | Oct 2 |
| R | DL TCI state ID 02 | | | Oct 3 |
| ... | | | | |
| DC$_N$ | DL TCI state ID N1 | | | Oct M-1 |
| R | DL TCI state ID N2 | | | Oct M |
| UC$_0$ | UL TCI state ID 01 | | | Oct M+1 |
| R | R | R | Power Control Parameter Set ID 01 | Oct M+2 |
| R | UL TCI state ID 02 | | | Oct M+3 |
| R | R | R | Power Control Parameter Set ID 02 | Oct M+4 |
| ... | | | | |
| UC$_N$ | UL TCI state ID N1 | | | Oct P-3 |
| R | R | R | Power Control Parameter Set ID N1 | Oct P-2 |
| R | UL TCI state ID 02 | | | Oct P-1 |
| R | R | R | Power Control Parameter Set ID N2 | Oct P |

Figure 4(d)

| R | Serving Cell ID | BWP ID | Oct 1 |
|---|---|---|---|
| R | DL TCI state ID 0 | | Oct 2 |
| R | UL TCI state ID 0 | | Oct 3 |
| ... | | | |
| R | DL TCI state ID N | | Oct M-1 |
| R | UL TCI state ID N | | Oct M |

Figure 5(a)

| R | Serving Cell ID | BWP ID | Oct 1 |
|---|---|---|---|
| R | DL TCI state ID 0 | | Oct 2 |
| | ... | | |
| R | DL TCI state ID N | | Oct N+2 |
| R | UL TCI state ID 0 | | Oct N+3 |
| | ... | | |
| R | UL TCI state ID N | | Oct M |

Figure 5(b)

| D=1 | Serving Cell ID | BWP ID | | Oct 1 |
|-----|-----------------|--------|--|-------|
| DL TCI state ID 0 | | | U=1 | Oct 2 |
| R | UL TCI state ID 0 | | | Oct 3 |
| | ... | | | |
| R | DL TCI state ID N | | | Oct M-1 |
| R | UL TCI state ID N | | | Oct M |

Figure 5(c)

| D=1 | Serving Cell ID | BWP ID | Oct 1 |
|---|---|---|---|
| DL TCI state ID 0 | | U=1 | Oct 2 |
| ... | | | |
| R | DL TCI state ID N | | Oct N+2 |
| R | UL TCI state ID 0 | | Oct N+3 |
| ... | | | |
| R | UL TCI state ID N | | Oct M |

Figure 5(d)

| D=1 | Serving Cell ID | BWP ID | Oct 1 |
|---|---|---|---|
| DL TCI state ID 0 | | U=0 | Oct 2 |
| R | DL TCI state ID 1 | | Oct 3 |
| R | DL TCI state ID 2 | | Oct 4 |
| R | DL TCI state ID 3 | | Oct 5 |
| R | DL TCI state ID 4 | | Oct 6 |
| R | DL TCI state ID 5 | | Oct 7 |
| R | DL TCI state ID 6 | | Oct 8 |
| R | DL TCI state ID 7 | | Oct 9 |

Figure 5(e)

| D=0 | Serving Cell ID | BWP ID | Oct 1 |
|---|---|---|---|
| | UL TCI state ID 0 | U=1 | Oct 2 |
| R | UL TCI state ID 1 | | Oct 3 |
| R | UL TCI state ID 2 | | Oct 4 |
| R | UL TCI state ID 3 | | Oct 5 |
| R | UL TCI state ID 4 | | Oct 6 |
| R | UL TCI state ID 5 | | Oct 7 |
| R | UL TCI state ID 6 | | Oct 8 |
| R | UL TCI state ID 7 | | Oct 9 |

Figure 5(f)

| R | Serving Cell ID | | BWP ID | Oct 1 |
|---|---|---|---|---|
| R | DL TCI state ID 0 | | | Oct 2 |
| R | UL TCI state ID 0 | | | Oct 3 |
| R | R | R | Power Control Parameter Set ID 0 (or PL-RS ID 0) | Oct 4 |
| | ... | | | |
| R | DL TCI state ID N | | | Oct M-2 |
| R | UL TCI state ID N | | | Oct M-1 |
| R | R | R | Power Control Parameter Set ID N (or PL-RS ID N) | Oct M |

Figure 6(a)

| | | | | | |
|---|---|---|---|---|---|
| R | Serving Cell ID | | | BWP ID | Oct 1 |
| R | DL TCI state ID 0 | | | | Oct 2 |
| ... | | | | | |
| R | DL TCI state ID N | | | | Oct N+2 |
| R | UL TCI state ID 0 | | | | Oct N+3 |
| R | R | R | Power Control Parameter Set ID 0 (or PL-RS ID 0) | | Oct N+4 |
| ... | | | | | |
| R | UL TCI state ID N | | | | Oct M-1 |
| R | R | R | Power Control Parameter Set ID N (or PL-RS ID N) | | Oct M |

Figure 6(b)

| D=1 | Serving Cell ID | BWP ID | Oct 1 |
|---|---|---|---|

| DL TCI state ID 0 | U=1 | Oct 2 |
|---|---|---|

| R | UL TCI state ID 0 | Oct 3 |
|---|---|---|

| R | R | R | Power Control Parameter Set ID 0 (or PL-RS ID 0) | Oct 4 |
|---|---|---|---|---|

| ... |
|---|

| R | DL TCI state ID N | Oct M-2 |
|---|---|---|

| R | UL TCI state ID N | Oct M-1 |
|---|---|---|

| R | R | R | Power Control Parameter Set ID N (or PL-RS ID N) | Oct M |
|---|---|---|---|---|

Figure 6(c)

| | | | | | |
|---|---|---|---|---|---|
| D=1 | Serving Cell ID | | | BWP ID | Oct 1 |
| DL TCI state ID 0 | | | | U=1 | Oct 2 |
| ... | | | | | |
| R | DL TCI state ID N | | | | Oct N+2 |
| R | UL TCI state ID 0 | | | | Oct N+3 |
| R | R | R | Power Control Parameter Set ID 0 (or PL-RS ID 0) | | Oct N+4 |
| ... | | | | | |
| R | UL TCI state ID N | | | | Oct M-1 |
| R | R | R | Power Control Parameter Set ID N (or PL-RS ID N) | | Oct M |

Figure 6(d)

| D=1 | Serving Cell ID | BWP ID | Oct 1 |
|---|---|---|---|
| DL TCI state ID 0 | | U=0 | Oct 2 |
| R | DL TCI state ID 1 | | Oct 3 |
| R | DL TCI state ID 2 | | Oct 4 |
| R | DL TCI state ID 3 | | Oct 5 |
| R | DL TCI state ID 4 | | Oct 6 |
| R | DL TCI state ID 5 | | Oct 7 |
| R | DL TCI state ID 6 | | Oct 8 |
| R | DL TCI state ID 7 | | Oct 9 |

Figure 6(e)

| D=0 | Serving Cell ID | BWP ID | Oct 1 |
|---|---|---|---|

| UL TCI state ID 0 | | | U=1 | Oct 2 |
|---|---|---|---|---|

| R | R | R | Power Control Parameter Set ID 0 (or PL-RS ID 0) | Oct 3 |
|---|---|---|---|---|

| ... | |
|---|---|

| R | UL TCI state ID N | Oct M-1 |
|---|---|---|

| R | R | R | Power Control Parameter Set ID N (or PL-RS ID N) | Oct M |
|---|---|---|---|---|

Figure 6(f)

| CORE SET Pool ID | Serving Cell ID | BWP ID | Oct 1 |
|---|---|---|---|
| R | DL TCI state ID 0 | | Oct 2 |
| R | UL TCI state ID 0 | | Oct 3 |
| | ... | | |
| R | DL TCI state ID N | | Oct M-1 |
| R | UL TCI state ID N | | Oct M |

Figure 7(a)

| CORE SET Pool ID | Serving Cell ID | | BWP ID | | Oct 1 |
|---|---|---|---|---|---|
| | R | | D=1 | U=1 | Oct 2 |
| R | DL TCI state ID 0 | | | | Oct 3 |
| R | UL TCI state ID 0 | | | | Oct 4 |
| | ... | | | | |
| R | DL TCI state ID N | | | | Oct M-1 |
| R | UL TCI state ID N | | | | Oct M |

Figure 7(b)

| CORE SET Pool ID | Serving Cell ID | | BWP ID | Oct 1 |
|---|---|---|---|---|
| R | DL TCI state ID 0 | | | Oct 2 |
| R | UL TCI state ID 0 | | | Oct 3 |
| R | R | R | Power Control Parameter Set ID 0 (or PL-RS ID 0) | Oct 4 |
| | ... | | | |
| R | DL TCI state ID N | | | Oct M-2 |
| R | UL TCI state ID N | | | Oct M-1 |
| R | R | R | Power Control Parameter Set ID N (or PL-RS ID N) | Oct M |

Figure 7(c)

| CORE SET Pool ID | Serving Cell ID | | BWP ID | Oct 1 |
|---|---|---|---|---|
| R | | | D=1 | U=1 | Oct 2 |
| R | DL TCI state ID 0 | | | Oct 3 |
| R | UL TCI state ID 0 | | | Oct 4 |
| R | R | R | Power Control Parameter Set ID 0 (or PL-RS ID 0) | Oct 5 |
| ... | | | | |
| R | DL TCI state ID N | | | Oct M-2 |
| R | UL TCI state ID N | | | Oct M-1 |
| R | R | R | Power Control Parameter Set ID N (or PL-RS ID N) | Oct M |

Figure 7(d)

| | | | |
|---|---|---|---|
| R | Serving Cell ID | BWP ID | Oct 1 |

| | | | | |
|---|---|---|---|---|
| R | | D=1 | U=1 | Oct 2 |

| | | |
|---|---|---|
| $DC_0$ | DL TCI state ID 01 | Oct 3 |
| R | DL TCI state ID 02 | Oct 4 |
| $UC_0$ | UL TCI state ID 01 | Oct 5 |
| R | UL TCI state ID 02 | Oct 6 |
| | ... | |
| $DC_N$ | DL TCI state ID N1 | Oct M-3 |
| R | DL TCI state ID N2 | Oct M-2 |
| $UC_N$ | UL TCI state ID N1 | Oct M-1 |
| R | UL TCI state ID N2 | Oct M |

Figure 8(a)

| | | | | |
|---|---|---|---|---|
| R | Serving Cell ID | | BWP ID | Oct 1 |
| R | | D=1 | U=1 | Oct 2 |
| $DC_0$ | DL TCI state ID 01 | | | Oct 3 |
| R | DL TCI state ID 02 | | | Oct 4 |
| ... | | | | |
| $DC_N$ | DL TCI state ID N1 | | | Oct M-1 |
| R | DL TCI state ID N2 | | | Oct M |
| $UC_0$ | UL TCI state ID 01 | | | Oct M+1 |
| R | UL TCI state ID 02 | | | Oct M+2 |
| ... | | | | |
| $UC_N$ | UL TCI state ID N1 | | | Oct 2M-3 |
| R | UL TCI state ID N2 | | | Oct 2M-2 |

Figure 8(b)

| R | Serving Cell ID | BWP ID | | Oct 1 |
|---|---|---|---|---|
| | R | D=1 | U=0 | Oct 2 |
| $DC_0$ | DL TCI state ID 01 | | | Oct 3 |
| R | DL TCI state ID 02 | | | Oct 4 |
| | ... | | | |
| $DC_N$ | DL TCI state ID N1 | | | Oct M-1 |
| R | DL TCI state ID N2 | | | Oct M |

Figure 8(c)

| | | | |
|---|---|---|---|
| R | Serving Cell ID | BWP ID | Oct 1 |
| R | | D=0 | U=1 | Oct 2 |
| $UC_0$ | UL TCI state ID 01 | | Oct 3 |
| R | UL TCI state ID 02 | | Oct 4 |
| ... | | | |
| $UC_N$ | UL TCI state ID N1 | | Oct M-1 |
| R | UL TCI state ID N2 | | Oct M |

Figure 8(d)

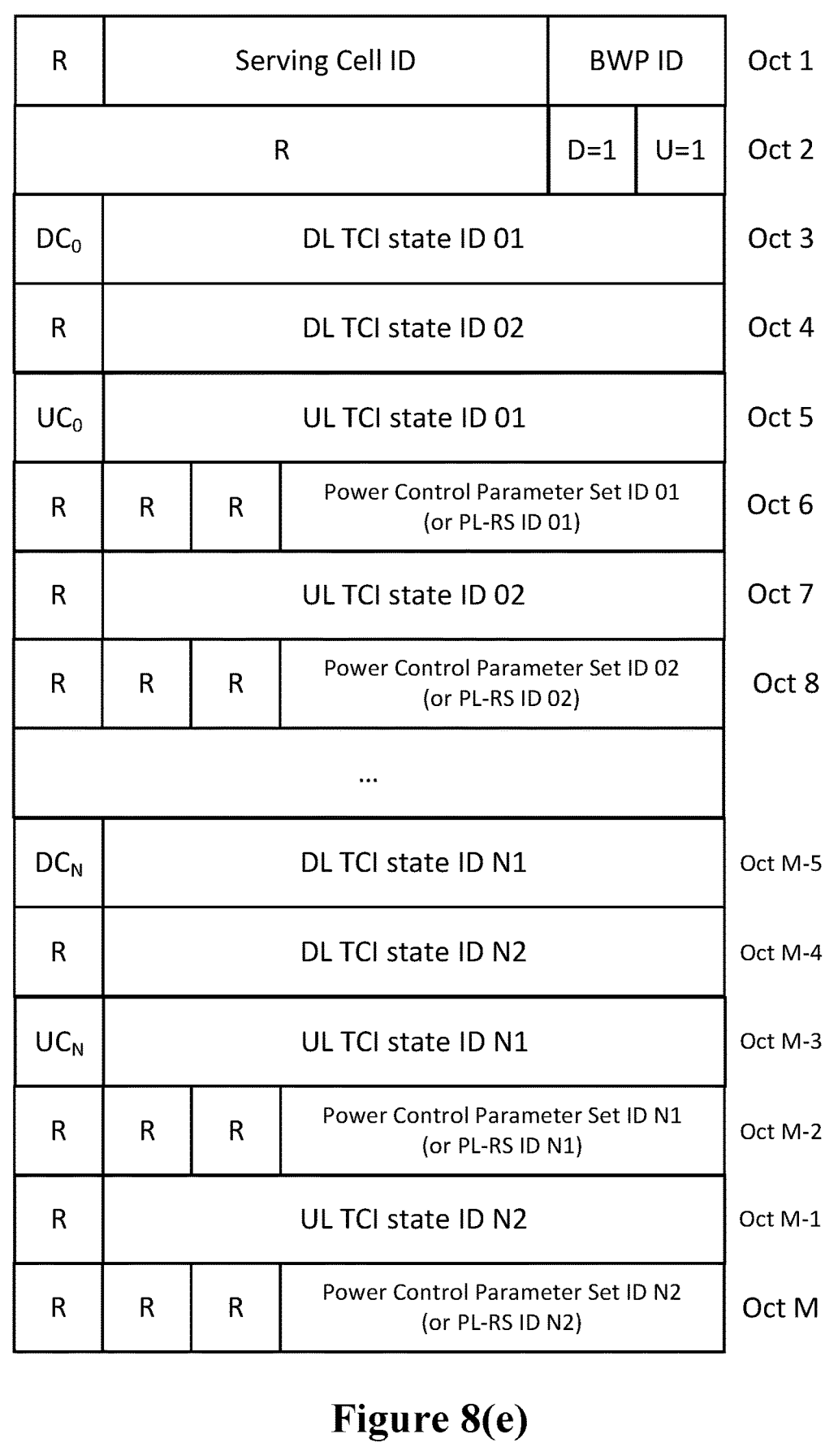

| | | | |
|---|---|---|---|
| R | Serving Cell ID | BWP ID | Oct 1 |

| | | | |
|---|---|---|---|
| R | | D=1 | U=1 | Oct 2 |

| | | |
|---|---|---|
| $DC_0$ | DL TCI state ID 01 | Oct 3 |

| | | |
|---|---|---|
| R | DL TCI state ID 02 | Oct 4 |

| | | |
|---|---|---|
| $UC_0$ | UL TCI state ID 01 | Oct 5 |

| | | | | |
|---|---|---|---|---|
| R | R | R | Power Control Parameter Set ID 01 (or PL-RS ID 01) | Oct 6 |

| | | |
|---|---|---|
| R | UL TCI state ID 02 | Oct 7 |

| | | | | |
|---|---|---|---|---|
| R | R | R | Power Control Parameter Set ID 02 (or PL-RS ID 02) | Oct 8 |

| |
|---|
| ... |

| | | |
|---|---|---|
| $DC_N$ | DL TCI state ID N1 | Oct M-5 |

| | | |
|---|---|---|
| R | DL TCI state ID N2 | Oct M-4 |

| | | |
|---|---|---|
| $UC_N$ | UL TCI state ID N1 | Oct M-3 |

| | | | | |
|---|---|---|---|---|
| R | R | R | Power Control Parameter Set ID N1 (or PL-RS ID N1) | Oct M-2 |

| | | |
|---|---|---|
| R | UL TCI state ID N2 | Oct M-1 |

| | | | | |
|---|---|---|---|---|
| R | R | R | Power Control Parameter Set ID N2 (or PL-RS ID N2) | Oct M |

Figure 8(e)

| | | | |
|---|---|---|---|
| R | Serving Cell ID | BWP ID | Oct 1 |

| | | | |
|---|---|---|---|
| R | | D=1 | U=1 | Oct 2 |

| | | |
|---|---|---|
| $DC_0$ | DL TCI state ID 01 | Oct 3 |

| | | |
|---|---|---|
| R | DL TCI state ID 02 | Oct 4 |

| |
|---|
| ... |

| | | |
|---|---|---|
| $DC_N$ | DL TCI state ID N1 | Oct M-1 |

| | | |
|---|---|---|
| R | DL TCI state ID N2 | Oct M |

| | | |
|---|---|---|
| $UC_0$ | UL TCI state ID 01 | Oct M+1 |

| | | | | |
|---|---|---|---|---|
| R | R | R | Power Control Parameter Set ID 01 (or PL-RS ID 01) | Oct M+2 |

| | | |
|---|---|---|
| R | UL TCI state ID 02 | Oct M+3 |

| | | | | |
|---|---|---|---|---|
| R | R | R | Power Control Parameter Set ID 02 (or PL-RS ID 02) | Oct M+4 |

| |
|---|
| ... |

| | | |
|---|---|---|
| $UC_N$ | UL TCI state ID N1 | Oct P-3 |

| | | | | |
|---|---|---|---|---|
| R | R | R | Power Control Parameter Set ID N1 (or PL-RS ID N1) | Oct P-2 |

| | | |
|---|---|---|
| R | UL TCI state ID N2 | Oct P-1 |

| | | | | |
|---|---|---|---|---|
| R | R | R | Power Control Parameter Set ID N2 (or PL-RS ID N2) | Oct P |

Figure 8(f)

| R | Serving Cell ID | | BWP ID | | Oct 1 |
|---|---|---|---|---|---|
| R | | | D=1 | U=0 | Oct 2 |
| DC$_0$ | DL TCI state ID 01 | | | | Oct 3 |
| R | DL TCI state ID 02 | | | | Oct 4 |
| ... | | | | | |
| DC$_N$ | DL TCI state ID N1 | | | | Oct M-1 |
| R | DL TCI state ID N2 | | | | Oct M |

Figure 8(g)

| | | | |
|---|---|---|---|
| R | Serving Cell ID | BWP ID | Oct 1 |

| | | | |
|---|---|---|---|
| R | | D=0 | U=1 | Oct 2 |

| | | |
|---|---|---|
| $UC_0$ | UL TCI state ID 01 | Oct 3 |

| | | | | |
|---|---|---|---|---|
| R | R | R | Power Control Parameter Set ID 01 (or PL-RS ID 01) | Oct 4 |

| | | |
|---|---|---|
| R | UL TCI state ID 02 | Oct 5 |

| | | | | |
|---|---|---|---|---|
| R | R | R | Power Control Parameter Set ID 02 (or PL-RS ID 02) | Oct 6 |

| | |
|---|---|
| ... | |

| | | |
|---|---|---|
| $UC_N$ | UL TCI state ID N1 | Oct M-3 |

| | | | | |
|---|---|---|---|---|
| R | R | R | Power Control Parameter Set ID N1 (or PL-RS ID N1) | Oct M-2 |

| | | |
|---|---|---|
| R | UL TCI state ID N2 | Oct M-1 |

| | | | | |
|---|---|---|---|---|
| R | R | R | Power Control Parameter Set ID N2 (or PL-RS ID N2) | Oct M |

Start transmitting one MAC CE that can simultaneously activate DL TCI states and UL TCI states, wherein the one MAC CE includes TCI state IDs that can be indicated as DL TCI state IDs identifying the DL TCI states to be activated and/or UL TCI state IDs identifying the UL TCI states to be activated End

1000

Start

1002 receiving one MAC CE that can simultaneously activate DL TCI states and UL TCI states, wherein the one MAC CE includes TCI state IDs that can be indicated as DL TCI state IDs identifying the DL TCI states to be activated and/or UL TCI state IDs identifying the UL TCI states to be activated End

SIMULTANEOUS TRANSMISSION CONFIGUTATION INDICATION (TCI) STATE ACTIVATION FOR UPLINK (UL) AND DOWNLINK (DL)

CROSS REFERENCE TO RELATED APPLICATIONS

This application is a national phase entry of International Application No. PCT/CN2020/119943 filed Oct. 9, 2020, which is incorporated by reference in its entirety.

FIELD

The subject matter disclosed herein generally relates to wireless communications, and more particularly relates to methods and apparatuses for simultaneously activating DL TCI states and UL TCI states.

BACKGROUND

The following abbreviations are herewith defined, at least some of which are referred to within the following description: New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), User Equipment (UE), Evolved Node B (eNB), Next Generation Node B (gNB), Uplink (UL), Downlink (DL), Central Processing Unit (CPU), Graphics Processing Unit (GPU), Field Programmable Gate Array (FPGA), Orthogonal Frequency Division Multiplexing (OFDM), Radio Resource Control (RRC), User Entity/Equipment (Mobile Terminal) (UE), Transmission Configuration Indication (TCI), Physical Downlink Control Channel (PDCCH), Physical Downlink Shared Channel (PDSCH), Frequency Range 2 (FR2), Medium Access Control (MAC), control element (CE), receiver (RX), transmitter (TX), Downlink control information (DCI), Reference Signal (RS), Path Loss RS (PL-RS), Physical Uplink Shared Channel (PUSCH), Physical Uplink Control Channel (PUCCH), control resource set (CORESET), Transmission and Reception Point (TRP), Bandwidth part (BWP), Component Carrier (CC).

Up to 128 DL TCI states can be configured for a UE in a BWP for DL RX beam indication by RRC signaling according to UE capability reporting. A DL TCI state activation/deactivation MAC CE can be used to activate up to 8 TCI states, which correspond to 3-bits transmission configuration indication (TCI) field contained in the scheduling DCI, from all configured DL TCI states for dynamic TCI state indication for PDSCH transmission scheduled by a DCI with a 3-bits TCI field.

If at least one of (1) and (2) is satisfied, a beam correspondence between TX beam and RX beam holds at UE or the UE has the capability of beam correspondence: (1) UE is able to determine a UE TX beam for the uplink transmission based on UE's downlink measurement on UE's one or more RX beams, and (2) UE is able to determine a UE RX beam for the downlink reception based on TRP's indication based on uplink measurement on UE's one or more TX beams. On the other hand, if neither (1) nor (2) is satisfied, beam correspondence does not hold at UE (which may be referred to as "UE without beam correspondence".

For a UE without beam correspondence, a set of UL TCI states may be newly introduced for dynamic UL TX beam indication for PUSCH. For example, up to 128 UL TCI states can be configured for a UE in a BWP for UL TX beam indication by RRC signaling according to UE capability reporting. A UL TCI state activation/deactivation MAC CE can be used to activate up to 8 UL TCI states from all configured UL TCI states for dynamic TCI state indication for PUSCH transmission scheduled by a DCI with a 3-bits TCI field. Considering the fact that both DL TCI states and UL TCI states may be required to be updated at the same time due to scenario changing or UE movement, it is favorable to update (activate) DL TCI states and UL TCI states simultaneously by using a same MAC CE.

The aim of the present invention is to support simultaneous activation of DL TCI states and UL TCI states for a UE without beam correspondence.

BRIEF SUMMARY

Methods and apparatuses for simultaneously activating DL TCI states and UL TCI states are disclosed.

In one embodiment, a method comprises transmitting one MAC CE that can simultaneously activate DL TCI states and UL TCI states, wherein the one MAC CE includes TCI state IDs that can be indicated as DL TCI state IDs identifying the DL TCI states to be activated and/or UL TCI state IDs identifying the UL TCI states to be activated.

In one embodiment, the one MAC CE further includes a 'D/U' field associated with each TCI state ID to indicate whether the TCI state ID is a DL TCI state ID or a UL TCI state ID. Alternatively, whether a TCI state ID is a DL TCI state ID or a UL TCI state ID depends on the position of the TCI state ID in the one MAC CE.

In another embodiment, the one MAC CE further includes a power control parameter set ID or a PL-RS ID identifying a power control parameter set or a PL-RS associated with each UL TCI state identified by a UL TCI state ID. In some embodiment, the one MAC CE includes a CORESET Pool ID field to indicate a CORESETPoolIndex value, and the DL TCI states and/or the UL TCI states activated by the one MAC CE are pointed to by a TCI field of a DCI transmitted from a CORESET configured with the CORESETPoolIndex value. In some embodiment, two DL TCI states identified by two DL TCI state IDs or two UL TCI states identified by two UL TCI state IDs can be pointed to by one TCI field of a DCI.

In some embodiment, the method further comprises transmitting a configuration of at least one simultaneous UL TCI update list for a UE by RRC signaling. In this condition, the UL TCI states identified by UL TCI state IDs and/or the associated power control parameter sets or PL-RSs are applied to for all BWPs configured in all CCs in one of the at least one simultaneous UL TCI update list containing the CC indicated by a serving cell ID field contained in the one MAC CE.

In some embodiment, the one MAC CE further includes a 'D' field and a 'U' field, the 'D' field indicates whether DL TCI state IDs are included in the one MAC CE, and the 'U' field indicates whether UL TCI state IDs are included in the one MAC CE.

In one embodiment, a method comprises receiving one MAC CE that can simultaneously activate DL TCI states and UL TCI states, wherein the one MAC CE includes TCI state IDs that can be indicated as DL TCI state IDs identifying the DL TCI states to be activated and/or UL TCI state IDs identifying the UL TCI states to be activated.

In yet another embodiment, a base unit comprises a transmitter, the transmitter transmits one MAC CE that can simultaneously activate DL TCI states and UL TCI states, wherein the one MAC CE includes TCI state IDs that can be indicated as DL TCI state IDs identifying the DL TCI states to be activated and/or UL TCI state IDs identifying the UL TCI states to be activated.

In another embodiment, a remote unit comprises a receiver, the receiver receives one MAC CE that can simultaneously activate DL TCI states and UL TCI states, wherein the one MAC CE includes TCI state IDs that can be indicated as DL TCI state IDs identifying the DL TCI states to be activated and/or UL TCI state IDs identifying the UL TCI states to be activated.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which:

FIG. 1(*a*) illustrates a TCI state activation/deactivation MAC CE according to a first embodiment;

FIG. 1(*b*) illustrates an example of the TCI state activation/deactivation MAC CE according to the first embodiment;

FIG. 1(*c*) illustrates a TCI state activation/deactivation MAC CE according to a variety of the first embodiment;

FIG. 2(*a*) illustrates a TCI state activation/deactivation MAC CE according to a second embodiment;

FIG. 2(*b*) illustrates a TCI state activation/deactivation MAC CE according to a variety of the second embodiment;

FIG. 2(*c*) illustrates a TCI state activation/deactivation MAC CE according to a further variety of the second embodiment;

FIG. 3(*a*) illustrates a TCI state activation/deactivation MAC CE for the case that power control parameters are configured for each UL TCI state by RRC signaling according to a third embodiment;

FIG. 3(*b*) illustrates a TCI state activation/deactivation MAC CE for the case that power control parameters are not configured for each UL TCI state by RRC signaling according to the third embodiment;

FIGS. 4(*a*) and 4(*b*) illustrate two TCI state activation/deactivation MAC CEs for the case that power control parameters are configured for each UL TCI state by RRC signaling according to a fourth embodiment;

FIGS. 4(*c*) and 4(*d*) illustrate two TCI state activation/deactivation MAC CEs for the case that power control parameters are not configured for each UL TCI state by RRC signaling according to the fourth embodiment;

FIGS. 5(*a*) to 5(*f*) illustrate TCI state activation/deactivation MAC CEs according to a fifth embodiment;

FIGS. 6(*a*) to 6(*f*) illustrate TCI state activation/deactivation MAC CEs according to a sixth embodiment;

FIGS. 7(*a*) to 7(*d*) illustrate TCI state activation/deactivation MAC CEs according to a seventh embodiment;

FIGS. 8(*a*) to 8(*h*) illustrate TCI state activation/deactivation MAC CEs according to a eighth embodiment;

DETAILED DESCRIPTION

Figure 9:
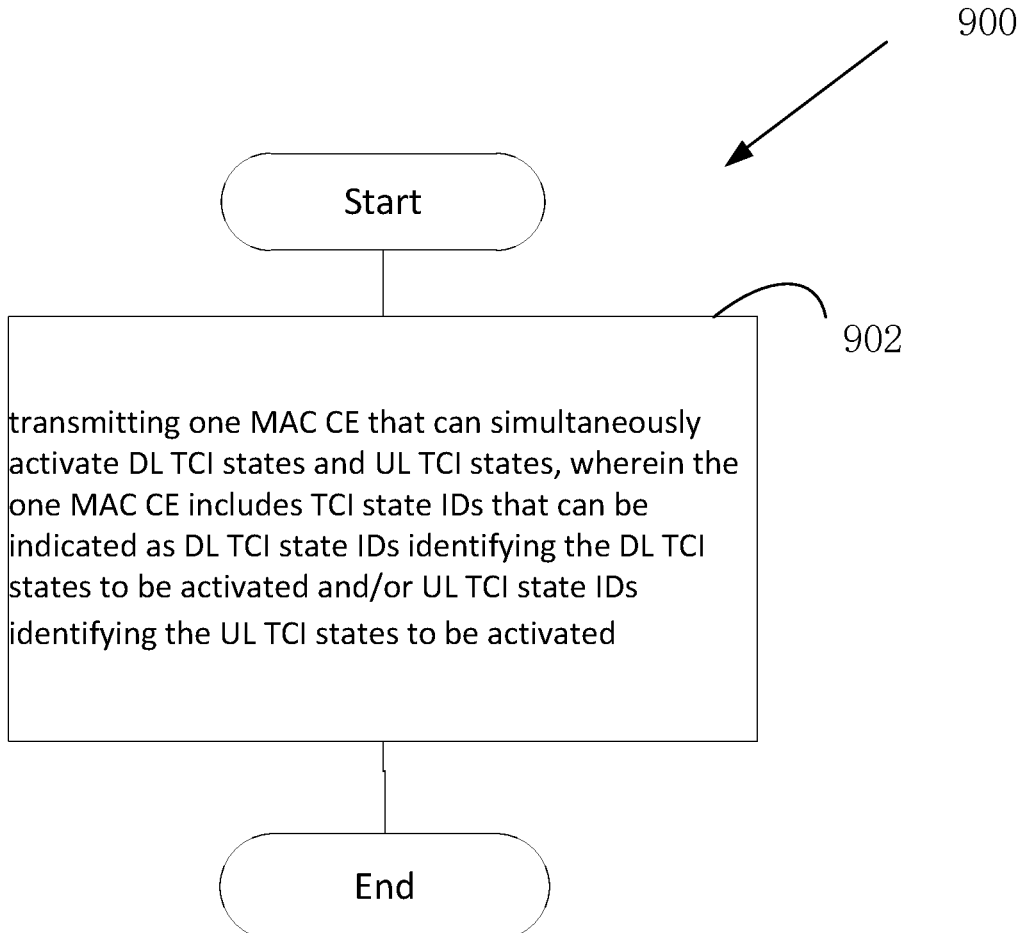
FIG. 9 is a schematic flow chart diagram illustrating an embodiment of a method.

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, is hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the FIGS. illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

As described in the background part, DL TCI states for PDSCH transmission can be activated by a MAC CE, while UL TCI states for PUSCH transmission can be also activated by a separate MAC CE. For the UE without beam correspondence, the DL TCI states for PDSCH transmission to be activated are up to 128 DL TCI states (referred to as "DL TCI state pool") configured by RRC signaling, while the UL TCI states for PUSCH transmission to be activated are up to 128 or 64 UL TCI states (referred to as "UL TCI state pool") configured by RRC signaling according to UE capability. In all of the following embodiments, 128 UL TCI states are assumed to be configured by RRC signaling. Although the DL TCI states for PDSCH transmission and the UL TCI states for PUSCH transmission are selected from different TCI state pools (i.e. "DL TCI state pool" and "UL TCI state pool"), both are required to be updated simultaneously in most cases. Considering that both a DL TCI state and a UL TCI state can be represented by a TCI state ID with 7 bits, while 8 out of all 128 states are to be activated for both dynamic DL TCI states and dynamic UL TCI states indication, it is reasonable to update the DL TCI states and the UL TCI states for UE-specific PDSCH transmission and/or PUSCH transmission by one MAC CE, so that MAC CE signaling overhead and latency can be reduced.

Depending on different scenarios of single TRP or multiple TRPs (e.g. two TRPs), different TCI state activation/deactivation MAC CE formats for simultaneously activating DL TCI states and UL TCI states are necessary. In scenario of single TRP, one TCI codepoint of a TCI field (DL TCI field or UL TCI field) included in the scheduling DCI points to one TCI state. In scenario of multi-TRP (e.g. two TRPs), one TCI codepoint of the TCI field may point to one or two TCI states. A TCI codepoint is a value of the TCI field. In the following description, "a TCI codepoint of a TCI field points to one or two TCI states" may be described as "a TCI field points to one or two TCI states".

Beam-specific power control for PUSCH transmission (may be abbreviated to "beam-specific power control") is supported in NR Release 15 and NR Release 16, where different power control parameters are associated with different UL beams. Therefore, the PL-RS or even all power control parameters at least including P0, alpha, closed loop index and PL-RS are required to be associated with each activated UL TCI state for the dynamic TX beam indication for PUSCH transmission if they are not configured in each UL TCI state by RRC signaling. P0 is used to configure the target receive power of gNB. Alpha (0<alpha<=1) is a power compensation factor. Closed loop index is used to indicate one index of two close loops. PL-RS is used to indicate a DL RS, which can be an NZP CSI-RS resource or a SSB resource, for the UE for DL pathloss estimation. In view of the above, when the power control parameters are not configured for each UL TCI state by RRC signaling, it should be configured by the TCI state activation/deactivation MAC CE for simultaneously activating DL TCI states and UL TCI states.

For each of the TCI state activation/deactivation MAC CE formats for simultaneously activating DL TCI states and UL TCI states, up to 128 DL TCI states are configured by RRC signaling. In particular, up to 128 DL TCI-StateIDs are configured to identify the configured DL TCI states. In addition, up to 128 UL TCI states are configured by RRC signaling. In particular, up to 128 UL TCI-StateIDs are configured to identify the configured UL TCI states. It is obvious that each of 128 DL TCI-StateIDs and 128 UL TCI-StateIDs is 7 bits.

The TCI state activation/deactivation MAC CE for the scenario of single TRP when the power control parameters are configured for each UL TCI state by RRC signaling according to a first embodiment is illustrated in FIG. 1(a). In the scenario of single TRP for both PDSCH and PUSCH transmissions, a TCI codepoint points to one TCI state. The TCI state activation/deactivation MAC CE according to the first embodiment has the following fields:

Serving cell ID (with 5 bits): This field indicates the identity of the serving cell for which the MAC CE applies.

BWP ID (with 2 bits): This field indicates the identity of the BWP for which the MAC CE applies.

D/U nj (n is from 0 to N, j=0 or 1): Each of 'D/U nj' fields occupies 1 bit and indicates whether the TCI state ID n field in the same octet is a DL TCI state ID or a UL TCI state ID. For example, 'D/U nj'=0 indicates that TCI state ID n in the same octet is a DL TCI state ID, and 'D/U nj'=1 indicates that TCI state ID n in the same octet is a UL TCI state ID. It is also feasible that 'D/U nj'=0 indicates that TCI state ID n in the same octet is a UL TCI state ID, and 'D/U nj'=1 indicates that TCI state ID n is a DL TCI state ID. For simplicity, in the following descriptions, 'D/U nj'=0 indicates that TCI state ID n in the same octet is a DL TCI state ID, and 'D/U nj'=1 indicates that TCI state ID n is a UL TCI state ID. 'D/U n0' and 'D/U n1' should have different values, so that one of two TCI state ID n fields, each of which is in the same octet as one of 'D/U n0' and 'D/U n1', is DL TCI state ID n; and the other of the two TCI state ID n fields is UL TCI state ID n. That is, if 'D/U n0'=0, then 'D/U n1'=1; or if 'D/U n0' =1, then 'D/U n1'=0.

TCI state ID n (n is from 0 to N): Each of TCI state ID n fields occupies 7 bits and indicates a TCI state identified by one of the 128 DL TCI-StateIDs or one of the 128 UL TCI-StateIDs, where n is the index of the codepoint of the TCI field in DCI (e.g. DCI format 0_1 or 0_2 for scheduling PUSCH transmission, or DCI format 1_1 or 1_2 for scheduling PDSCH transmission). Note that in the MAC CE shown in FIG. 1(a), for each value of n (n is from 0 to N), there are two TCI state ID n fields. If the 'D/U nj' field in the same octet as the TCI state ID n field is set to 0, the TCI state ID n is one of 128 configured DL TCI-StateIDs; if the 'D/U nj' field in the same octet as the TCI state ID n field is set to 1, the TCI state ID n is one of 128 configured UL TCI-StateIDs. As one of 'D/U n0' and 'D/U n1' is set to 0 while the other of 'D/U n0' and 'D/U n1' is set to 1, two TCI state ID n fields are indicated as one DL TCI state ID n and one UL TCI state ID n.

When N is 7, eight DL TCI states (identified by TCI state IDs 0 to 7 in the same octet as 'D/U nj' fields set to 0) and eight UL TCI states (identified by TCI state IDs 0 to 7 in the same octet as 'D/U nj' fields set to 1) can be activated (updated) by the MAC CE corresponding to 3-bits TCI field contained in DCI. Although N is not necessarily 7, in the following descriptions, N is assumed to be 7.

R: Reserved bit, set to 0.

Note that in FIG. 1(a) as well as all of the following figures, "Oct" means an octet.

The TCI state activation/deactivation MAC CE according to the first sub-embodiment has M octets. The value of M depends on the value of N (e.g. M=2*(N+1)+1). When N is 7, M is 17.

FIG. 1(b) is an example of the TCI state activation/deactivation MAC CE according to the first embodiment. When the TCI state activation/deactivation MAC CE as shown in FIG. 1(b) is transmitted by the gNB (base station) and received by the UE, the DL TCI states and UL TCI states are activated (updated) for the serving cell identified by the serving cell ID and for the BWP identified by the BWP ID, as shown in Table 1.

TABLE 1

| DL TCI codepoint | TCI state | UL TCI codepoint | TCI state |
|---|---|---|---|
| 000 | DL TCI state#2 | 000 | UL TCI state#3 |
| 001 | DL TCI state#6 | 001 | UL TCI state#7 |

TABLE 1-continued

| DL TCI codepoint | TCI state | UL TCI codepoint | TCI state |
|---|---|---|---|
| 010 | DL TCI state#10 | 010 | UL TCI state#14 |
| 011 | DL TCI state#18 | 011 | UL TCI state#26 |
| 100 | DL TCI state#26 | 100 | UL TCI state#30 |
| 101 | DL TCI state#50 | 101 | UL TCI state#58 |
| 110 | DL TCI state#122 | 110 | UL TCI state#121 |
| 111 | DL TCI state#123 | 111 | UL TCI state#123 |

In the MAC CE illustrated in FIG. 1(a) and FIG. 1(b), two TCI state IDs with the same index n for DL and UL are positioned in adjacent octets, and TCI state IDs with different indices are sequentially positioned, with smaller index positioned in front. For example, two "TCI state ID 0"s for DL and UL are positioned in octets 2 and 3. Two "TCI state ID 1"s for DL and UL are positioned in octets 4 and 5. In other words, the TCI state ID positioned in octet 2 or 3 is determined as TCI state ID 0, while whether it is DL TCI state ID 0 or UL TCI state ID 0 depends on the 'D/U 0j' (j=0 or 1) field in the same octet as the TCI state ID 0. The TCI state ID positioned in octet 4 or 5 is determined as TCI state ID 1, while whether it is DL TCI state ID 1 or UL TCI state ID 1 depends on the 'D/U 1j' (j=0 or 1) field in the same octet as the TCI state ID 1. For example, as shown in FIG. 1(b), the 'D/U 00' field in octet 2 is 0, which indicates that the TCI state ID 0 in octet 2 is DL TCI state ID 0; and the 'D/U 01' field in octet 3 is 1, which indicates that the TCI state ID 0 in octet 3 is UL TCI state ID 0.

It can be seen that the index of TCI state ID is determined by the predetermined position in the MAC CE (e.g. the TCI state ID in octets 2 and 3 are TCI state ID 0; the TCI state ID in octets 4 and 5 are TCI state ID 1; etc.), while whether the TCI state ID n is DL TCI state ID n or UL TCI state ID n is determined by the 'D/U nj' field in the same octet as the TCI state ID n.

In the MAC CE illustrated in FIG. 1(a) and FIG. 1(b), the TCI state IDs with different indices are sequentially positioned, with smaller index positioned in front. It is obviously feasible that the TCI state IDs with different indices are sequentially positioned, with larger index positioned in front (e.g. the TCI state ID in octets 2 and 3 are TCI state ID N (TCI state ID 7)).

The TCI state activation/deactivation MAC CE according to a variety of the first embodiment is illustrated in FIG. 1(c). As shown in FIG. 1(c), TCI state ID 0 are positioned in octets 2 and 10, TCI state ID 1 are positioned in octets 3 and 11, . . . . That is, TCI state ID n are positioned in octets n+2 and n+10. In other words, one group of TCI state IDs 0 to N are positioned in front of another group of TCI states IDs 0 to N. In the example of FIG. 1(c), all of 'D/U' fields (in particular, 'D/U n0' fields) in octets 2-9 are set to 0, which indicates that TCI states 0 to 7 in octets 2-9 are DL TCI states 0 to 7; and all of 'D/U' fields (in particular, 'D/U n0' fields) in octets 10-17 are set to 1, which indicates that TCI states 0 to 7 in octets 10-17 are UL TCI states 0 to 7. For simplicity, in the following description, each 'D/U nj' (n is from 0 to N, j=0 or 1) field can be abbreviated as 'D/U' field. For another example, all of 'D/U' fields in octets 2-9 can be set to 1, which indicates that TCI states 0 to 7 in octets 2-9 are UL TCI states 0 to 7; and all of 'D/U' fields in octets 10-17 are set to 0, which indicates that TCI states 0 to 7 in octets 10-17 are DL TCI states 0 to 7. It is not necessary that 'D/U' fields in octets 2-9 (or in octets 10-17) are all set to 0

(or 1). According to the first embodiment, it is only necessary that one TCI state ID n is in an octet containing a 'D/U' field being set to 0 (e.g. indicating DL TCI state ID n) while another TCI state ID n is in an octet containing a 'D/U' field being set to 1 (e.g. indicating UL TCI state ID n).

The TCI state activation/deactivation MAC CE according to the variety of the first embodiment also has M octets. The value of M depends on the value of N (e.g. M=2*(N+1)+1). When N is 7, M is 17.

The TCI state activation/deactivation MAC CE for the scenario of single TRP for the case that power control parameters are not configured for each UL TCI state by RRC signaling according to a second embodiment is illustrated in FIG. 2(a). In the scenario of single TRP for both PDSCH and PUSCH transmissions, a TCI codepoint points to one TCI state. The TCI state activation/deactivation MAC CE according to the second embodiment has the following fields:

Serving cell ID (with 5 bits): This field indicates the identity of the serving cell for which the MAC CE applies.

BWP ID (with 2 bits): This field indicates the identity of the BWP for which the MAC CE applies.

D/U nj (n is from 0 to N, j=0 or 1): Each of 'D/U nj' fields occupies 1 bit and indicates whether the TCI state ID n field in the same octet is a DL TCI state ID or a UL TCI state ID. For example, 'D/U nj'=0 indicates that TCI state ID n in the same octet is a DL TCI state ID, and 'D/U nj'=1 indicates that TCI state ID n is a UL TCI state ID. 'D/U n0' and 'D/U n1' should have different values. That is, if 'D/U n0'=0, then 'D/U n1'=1; or if 'D/U n0'=1, then 'D/U n1'=0.

TCI state ID n (n is from 0 to N): Each of TCI state ID n fields occupies 7 bits and indicates a TCI state identified by one of the 128 DL TCI-StateIDs or one of the 128 UL TCI-StateIDs, where n is the index of the codepoint of the TCI field in DCI (e.g. DCI format 0_1 or 0_2 for scheduling PUSCH transmission, or DCI format 1_1 or 1_2 for scheduling PDSCH transmission). Note that in the MAC CE shown in FIG. 2(a), for each value of n (n is from 0 to N), there are two TCI state ID n fields. If the 'D/U nj' field in the same octet as the TCI state ID n field is set to 0, the TCI state ID n is one of 128 configured DL TCI-StateIDs; if the 'D/U nj' field in the same octet as the TCI state ID n field is set to 1, the TCI state ID n is one of 128 configured UL TCI-StateIDs.

Power Control Parameter Set ID n (n is from 0 to N): Each of Power Control Parameter Set ID n fields occupies 5 bits and indicates a power control parameter set including power control parameters associated with the UL TCI state indicated by TCI state ID n field. The power control parameters may include P0, Alpha, Closed loop index and PathlossReferenceRS (PL-RS). P0 is used to configure the target receive power of gNB. Alpha (0<alpha<=1) is a power compensation factor. Closed loop index is used to indicate one index of two close loops. PL-RS is used to indicate a DL RS, which can be an NZP CSI-RS resource or a SSB resource, for the UE for DL pathloss estimation. A power control parameter set is associated with an activated UL TCI state for dynamic TX beam indication for PUSCH. SRI-PUSCH-PowerControl, each of which has a sri-PUSCH-PowerControlId, defined in NR Release 15 or 16 as shown in Table 2 can be used as the power control parameter set indication.

TABLE 2

```
SRI-PUSCH-PowerControl ::=            SEQUENCE {
   sri-PUSCH-PowerControlId               SRI-PUSCH-PowerControlId,
   sri-PUSCH-PathlossReferenceRS-Id          PUSCH-PathlossReferenceRS-Id,
   sri-P0-PUSCH-AlphaSetId              P0-PUSCH-AlphaSetId,
   sri-PUSCH-ClosedLoopIndex              ENUMERATED { i0, i1 }
}
PUSCH-PathlossReferenceRS-r16 ::=        SEQUENCE {
   pusch-PathlossReferenceRS-Id-r16          PUSCH-PathlossReferenceRS-Id-r16;
   referenceSignal-r16               CHOICE {
      ssb-Index-r16                 SSB-Index,
      csi-RS-Index-r16                 NZP-CSI-RS-ResourceId
   }
}
```

Up to 32 power control parameter sets can be configured for a UE in a BWP. Therefore, the power control parameter set associated with an activated UL TCI state can be represented by a power control parameter set ID with 5 bits.

The power control parameter set ID n fields are only associated with UL TCI states. So, the octet containing a power control parameter set ID n field is positioned immediately after an octet containing UL TCI state ID n which is an octet containing a 'D/U nj' (j=0 or 1) field being set to 1. As shown in FIG. 2(a), when 'D/U 01' is set to 1, the octet (octet 4) containing power control parameter set ID 0 is immediately after the octet (octet 3) containing 'D/U 01' and TCI state ID 0. For another example, when 'D/U N0' is set to 1, the octet (octet M-1) containing power control parameter set ID N is immediately after the octet (octet M-2) containing 'D/U N0' and TCI state ID N.

R: Reserved bit, set to 0.

When the TCI state activation/deactivation MAC CE as shown in FIG. 2(a) is transmitted by the gNB (base station) and received by the UE, the DL TCI states and UL TCI states identified by TCI state IDs 0 to N (a group of TCI state IDs 0 to N are indicated as DL TCI state IDs 0 to N, and another group of TCI state IDs 0 to N are indicated as UL TCI state IDs 0 to N) are activated (updated). In addition, each activated UL TCI state n is associated with a power control parameter set identified by power control parameter set ID n.

A TCI state activation/deactivation MAC CE according to a variety of the second embodiment is illustrated in FIG. 2(b).

In FIG. 2(b), a UL TCI state is associated with a PL-RS rather than a power control parameter set. The PUSCH-PathlossReferenceRS-r16, each of which is configured with a pusch-PathlossReferenceRS-Id-r16, configured in NR Release 16 can be used as PL-RS indication. A PL-RS can be identified by a PL-RS ID with 5 bits.

The other fields of FIG. 2(b) (e.g. Serving cell ID, BWP ID, 'D/U nj' (n is from 0 to N, j=0 or 1), and TCI state ID n (n is from 0 to N)) are the same as FIG. 2(a).

In FIG. 2(b), the octet (octet 3) containing PL-RS ID 0 is immediately after the octet (octet 2) containing 'D/U 00' (suppose 'D/U 00' is set to 1 while 'D/U 01' is set to 0). In addition, the octet (octet M) containing PL-RS ID N is immediately after the octet (octet M-1) containing 'D/U N1' (suppose 'D/U N1' is set to 1 while 'D/U N0' is set to 0).

It can be seen from FIGS. 2(a) and 2(b) that two TCI state IDs with the same index n for DL and UL are positioned in adjacent octets (without considering the octets containing power control parameter set ID n or the PL-RS ID n fields), and the TCI state IDs with different indices are sequentially positioned, with smaller index positioned in front. For example, two "TCI state ID 0"s for DL and UL are positioned in octets 2 to 4 (one of octets 3 and 4 contains power control parameter set ID 0 or PL-RS ID 0 field: when 'D/U 00' is set to 1, octet 3 contains power control parameter set ID 0 or PL-RS ID 0 field; and when 'D/U 01' is set to 1, octet 4 contains power control parameter set ID 0 or PL-RS ID 0 field). In other words, the TCI state ID positioned in one of octets 2 to 4 (in particular, octet 2 and one of octets 3 and 4) is determined as TCI state ID 0, while whether it is DL TCI state ID 0 or UL TCI state ID 0 depends on the 'D/U 0j' (j=0 or 1) field in the same octet as the TCI state ID 0. If 'D/U 0j' (j=0 or 1) is set to 1 in octet 2 or 3, the next octet (octet 3 or 4) contains power control parameter set ID 0 or PL-RS ID 0 field.

Since the index of TCI state ID is determined by the predetermined position in the MAC CE, one group of TCI state IDs 0 to 7 can be positioned in front of another group of TCI state IDs 0 to 7. In addition, each of TCI state IDs 0 to 7 that is in the same octet as a 'D/U' field set to 1 is followed by an octet containing power control parameter set ID n or PL-RS ID n field. FIG. 2(c) illustrates an example of the TCI state activation/deactivation MAC CE according to a further variety of the second embodiment. As shown in FIG. 2(c), a group of TCI state IDs 0 to 7 (in octets 2, 3, 5, 7, 8, 9, 10 and 12) are in front of another group of TCI state IDs 0 to 7 (in octets 13, 15, 16, 17, 19, 21, 23 and 24). Each of the power control parameter set IDs 0 to 7 (which can be replaced by PL-RS IDs 0 to 7) is in an octet (i.e. octets 4, 6, 11, 14, 18, 20, 22 and 25) immediately after the octet (i.e. octets 3, 5, 10, 13, 17, 19, 21 and 24) containing a 'D/U' field being set to 1 and each of TCI state IDs 0 to 7 (that are indicated as UL TCI state IDs 0 to 7).

The TCI state activation/deactivation MAC CE according to the second embodiment has M octets. The value of M depends on the value of N (e.g. M=3*(N+1)+1). When N is 7, M is 25.

Multi-DCI based multi-TRP PDSCH transmission, which can be configured per cell, is supported in NR release 16. In the scenario of multi-DCI based multi-TRP (e.g. two TRPs) PDSCH transmission, a DCI transmitted from one TRP can schedule a PDSCH transmission to be transmitted from the one TRP, and a DCI transmitted from another TRP can schedule a PDSCH transmission to be transmitted from the other TRP. Similarly, multi-DCI based multi-TRP PUSCH transmission is also supported, a DCI transmitted from one TRP can schedule a PUSCH transmission to be transmitted to the one TRP, and a DCI transmitted from another TRP can schedule a PUSCH transmission to be transmitted to the other TRP.

Two TCI state activation/deactivation MAC CEs for the scenario of multi-DCI based multi-TRP PDSCH and PUSCH transmissions according to a third embodiment are illustrated in FIGS. 3(a) and 3(b), respectively, in which the TCI state activation/deactivation MAC CE shown in FIG. 3($a$) for the case when the power control parameters are configured for each UL TCI state by RRC signaling, the TCI state activation/deactivation MAC CE shown in FIG. 3($b$) for the case that the power control parameters are not configured for each UL TCI state by RRC signaling.

The TCI state activation/deactivation MAC CEs according to the third embodiment has the following fields:

CORESET Pool ID (with 1 bit): This field indicates a value of higher layer parameter CORESETPoolIndex configured for a CORESET, which identifies a set of time-frequency resources for PDCCH transmission, transmitting the PDCCH carrying the DCI. The higher layer parameter CORESETPoolIndex is configured per CORESET for TRP identification. The CORESET Pool ID field is set to 1 to indicate that the DL TCI states activated in the MAC CE can be pointed to by DL TCI field of a DL DCI transmitted from the CORESET configured with the CORESETPoolIndex value 1, and that the UL TCI states activated in the MAC CE can be pointed to by UL TCI field of a UL DCI transmitted from the CORESET configured with the CORESETPoolIndex value 1. The CORESET Pool ID field is set to 0 to indicate that the DL TCI states activated in the MAC CE can be pointed to by DL TCI field of a DL DCI transmitted from the CORESET configured with the CORESETPoolIndex value 0, and that the UL TCI states activated in the MAC CE can be pointed to by UL TCI field of a UL DCI transmitted from the CORESET configured with the CORESETPoolIndex value 0. In other words, the MAC CE containing the CORESET Pool ID field with a different value applies to a DCI transmitted from a different TRP. In addition, if power control parameter set IDs or PL-RS IDs are contained in the MAC CE, each activated UL TCI state n is associated with a power control parameter set identified by power control parameter set ID n or associated with a PL-RS identified by PL-RS ID n.

The other fields in FIG. 3($a$) are the same as those contained in FIG. 1($a$). The other fields in FIG. 3($b$) are the same as those contained in FIG. 2($a$).

The TCI state activation/deactivation MAC CEs shown in FIGS. 1($b$), 1($c$), 2($b$) and 2($c$) can be also amended to add a CORESET Pool ID field to replace the first reserved bit in octet 1, to become TCI state activation/deactivation MAC CEs according to the third embodiment for the scenario of multi-DCI based multi-TRP PDSCH and PUSCH transmissions.

The TCI state activation/deactivation MAC CE according to the third sub-embodiment has M octets. The value of M depends on the value of N and whether power control parameters are configured for each UL TCI state by RRC signaling or not. When power control parameters are configured for each UL TCI state by RRC signaling (e.g. as shown in FIG. 3($a$)), M=2*(N+1)+1. For example, when N is 7, M is 17. When power control parameters are not configured for each UL TCI state by RRC signaling (e.g. as shown in FIG. 3($b$)), M=3*(N+1)+1. For example, when N is 7, M is 25.

Single-DCI based multi-TRP PDSCH transmission, which can be configured per carrier, is supported in NR release 16. In the scenario of single-DCI based multi-TRP (e.g. two TRPs) PDSCH transmission, a DCI transmitted from one TRP may schedule a PDSCH transmission to be transmitted from two TRPs. Accordingly, two different DL TCI states may be pointed to by one TCI codepoint of DL TCI field of the DCI. As a matter of fact, it is possible that only some TCI codepoint(s) of the DL TCI field point to two different DL TCI states, which means that some other TCI codepoint(s) of the DL TCI field only point to one DL TCI state.

With ideal backhaul for potential PUSCH repetition, single-DCI based multi-TRP (e.g. two TRPs) PUSCH transmission is also supported, in which a DCI transmitted from one TRP can schedule a PUSCH transmission to be transmitted to two TRPs with multi-beam repetition. Similarly, two different UL TCI states may be pointed to by one TCI codepoint of UL TCI field of the DCI. In addition, it is possible that only some TCI codepoint(s) of the UL TCI field point to two different UL TCI states, which means that some other TCI codepoint(s) of the UL TCI field only point to one UL TCI state.

The TCI state activation/deactivation MAC CEs for the scenario of single-DCI based multi-TRP PDSCH and PUSCH transmissions according to a fourth embodiment are illustrated in FIGS. 4($a$) to 4($d$). In particular, the TCI state activation/deactivation MAC CEs shown in FIGS. 4($a$) and 4($b$) for the case when the power control parameters are configured for each UL TCI state by RRC signaling, while the TCI state activation/deactivation MAC CEs shown in FIGS. 4($c$) and 4($d$) for the case when the power control parameters are not configured for each UL TCI state by RRC signaling.

The TCI state activation/deactivation MAC CE shown in FIG. 4($a$) has the following fields:

Serving cell ID (with 5 bits): This field indicates the identity of the serving cell for which the MAC CE applies.

BWP ID (with 2 bits): This field indicates the identity of the BWP for which the MAC CE applies.

$DC_n$ (n is from 0 to N): Each of $DC_n$ fields occupies 1 bit and indicates whether the octet containing DL TCI state ID n2 is present. If the $DC_n$ field is set to "1", the octet containing DL TCI state ID n2 is present. It means that a TCI codepoint with index n of a DL TCI field of the DCI points to two DL TCI states identified by DL TCI state ID n1 and DL TCI state ID n2. If the $DC_n$ field is set to "0", the octet containing DL TCI state ID n2 is not present. It means that a TCI codepoint with index n of a DL TCI field of the DCI points to one DL TCI state identified by DL TCI state ID n1.

DL TCI state ID n1 (n is from 0 to N): Each of DL TCI state ID n1 fields occupies 7 bits and indicates a DL TCI state identified by one of the 128 DL TCI-StateIDs configured by RRC signaling, where n is the index of the codepoint of the DL TCI field of the DCI. DL TCI state ID n1 identifies the first TCI state pointed to by the $n^{th}$ codepoint of the DL TCI field of the DCI. The maximum number of activated DL TCI codepoints is 8 (when N is 7).

DL TCI state ID n2 (n is from 0 to N): Each of DL TCI state ID n2 fields is present when the $DC_n$ field is set to "1". Each DL TCI state ID n2 field occupies 7 bits and indicates a DL TCI state identified by one of the 128 DL TCI-StateIDs configured by RRC signaling, where n is the index of the codepoint of the DL TCI field of the DCI. TCI state ID n2 identifies the second TCI state pointed to by the $n^{th}$ codepoint of the DL TCI field of the DCI.

$UC_n$ (n is from 0 to N): Each of $UC_n$ fields occupies 1 bit and indicates whether the octet containing UL TCI state ID n2 is present. If the $UC_n$ field is set to "1", the octet containing UL TCI state ID n2 is present. It means that a TCI codepoint with index n of a UL TCI field of the DCI points to two UL TCI states identified by UL TCI state ID n1 and UL TCI state ID n2. If the $UC_n$ field is set to "0", the octet containing UL TCI state ID n2 is not present. It means that a TCI codepoint with index n of a UL TCI field of the DCI points to one UL TCI state identified by UL TCI state ID n1.

UL TCI state ID n1 (n is from 0 to N): Each of UL TCI state ID n1 fields occupies 7 bits and indicates a UL TCI state identified by one of the 128 UL TCI-StateIDs configured by RRC signaling, where n is the index of the codepoint of the UL TCI field of the DCI. UL TCI state ID n1 identifies the first TCI state pointed to by the $n^{th}$ codepoint of the UL TCI field of the DCI. The maximum number of activated UL TCI codepoints is 8 (when N is 7).

UL TCI state ID n2 (n is from 0 to N): Each of UL TCI state ID n2 fields is present when the $UC_n$ field is set to "1". Each UL TCI state ID n2 field occupies 7 bits and indicates a UL TCI state identified by one of the 128 UL TCI-StateIDs configured by RRC signaling, where n is the index of the codepoint of the UL TCI field of the DCI. UL TCI state ID n2 identifies the second TCI state pointed to by the $n^{th}$ codepoint of the UL TCI field of the DCI.

R: Reserved bit, set to 0.

As can be seen from FIG. 4(a), the first bit of the octet containing DL or UL TCI state ID n1 is occupied by $DC_n$ or $UC_n$ field. Accordingly, there is no bit for 'D/U' field to indicate whether the TCI state ID n field is a DL TCI state ID n or a UL TCI state ID n. Therefore, according to the fourth embodiment, whether a TCI state ID n field is a DL TCI state ID or a UL TCI state ID is predetermined according to its position. For example, in FIG. 4(a), the sequence of TCI state IDs are TCI codepoint 0 (including at least DL TCI state ID 01 and UL TCI state ID 01, where the presences of DL TCI state ID 02 and UL TCI state ID 02 depend on the values of $DC_0$ and $UC_0$, respectively), TCI codepoint 1, . . . , TCI codepoint N (including at least DL TCI state ID N1 and UL TCI state ID N1, where the presences of DL TCI state ID N2 and UL TCI state ID N2 depend on the values of $DC_N$ and $UC_N$, respectively).

In FIG. 4(a), the octet containing each DL TCI state ID n1 is predetermined to be positioned in front of the octet containing each UL TCI state ID n1. It is also feasible that the octet containing each UL TCI state ID n1 is predetermined to be positioned in front of the octet containing each DL TCI state ID n1.

FIG. 4(a) shows that the MAC CE contains M octets. The number of M is variable depending on the value of N and the number of $DC_n$ and $UC_n$ fields being equal to 1 (or being equal to 0). When N is 7, M is maximally 33 (the number of $DC_n$ and $UC_n$ fields being equal to 1 is 16 or the number of $DC_n$ and $UC_n$ fields being equal to 0 is 0), and minimally 17 (the number of $DC_n$ and $UC_n$ fields being equal to 1 is 0 or the number of Cn fields being equal to 0 is 16).

FIG. 4(b) illustrates an alternative example of the TCI state activation/deactivation MAC CE when the power control parameters are configured for each UL TCI state by RRC signaling according to the fourth embodiment. FIG. 4(b) differs from FIG. 4(a) only in the positions of DL TCI state IDs and UL TCI state IDs. As can be seen from FIG. 4(b), all of DL TCI state IDs are positioned in front of UL TCI state IDs. It is obvious that all of UL TCI state IDs can be predetermined to be positioned in front of all of DL TCI state IDs.

All of fields of the TCI state activation/deactivation MAC CE shown in FIG. 4(b) are the same as those shown in FIG. 4(a).

FIG. 4(b) shows that the MAC CE contains 2M-1 octets. The number of octets of the MAC CE shown in FIG. 4(b) is the same as the number of octets of the MAC CE shown in FIG. 4(a). That is, when N is 7, the number of octets of the MAC CE shown in FIG. 4(b) is maximally 33 (the number of $DC_n$ and $UC_n$ fields being equal to 1 is 16 or the number of $DC_n$ and $UC_n$ fields being equal to 0 is 0) (i.e. 2M-1 is 33)

and minimally 17 (the number of $DC_n$ and $UC_n$ fields being equal to 1 is 0 or the number of $DC_n$ and $UC_n$ fields being equal to 0 is 16) (i.e. 2M-1 is 17).

The TCI state activation/deactivation MAC CEs shown in FIGS. 4(a) and 4(b) for the case when the power control parameters are configured for each UL TCI state by RRC signaling. The TCI state activation/deactivation MAC CEs shown in FIGS. 4(c) and 4(d) for the case when the power control parameters are not configured for each UL TCI state by RRC signaling.

FIG. 4(c) differs from FIG. 4(a) in that power control parameter set ID n1 fields and power control parameter set ID n2 fields are added.

Each of Power Control Parameter Set ID n1 fields occupies 5 bits and indicates a power control parameter set including power control parameters associated with the UL TCI state indicated by UL TCI state ID n1 field. Each of Power Control Parameter Set ID n2 fields occupies 5 bits and indicates a power control parameter set including power control parameters associated with the UL TCI state indicated by UL TCI state ID n2 field. It is obvious that each power control parameter set ID n1 field and each power control parameter set ID n2 field can be replaced by a PL-RS ID n1 field and a PL-RS ID n2 field, if a UL TCI state is associated with a PL-RS rather than a power control parameter set.

In FIG. 4(c), each of $UC_n$ fields indicates not only whether the octet containing UL TCI state ID n2 is present but also whether the octet containing power control parameter set ID n2 (or PL-RS ID n2) is present. If the $UC_n$ field is set to "1", the octet containing UL TCI state ID n2 and the octet containing power control parameter set ID n2 (or PL-RS ID n2) are present, and they are positioned immediately after the octet containing power control parameter set ID n1 (or PL-RS ID n1). It means that a TCI codepoint with index n of a UL TCI field of the DCI points to two UL TCI states identified by UL TCI state ID n1 and UL TCI state ID n2, and the two UL TCI states identified by UL TCI state ID n1 and UL TCI state ID n2 are associated, respectively, to two power control parameter sets identified by power control parameter set ID n1 and power control parameter set ID n2 (or two PL-RSs identified by PL-RS ID n1 and PL-RS ID n2). If the $UC_n$ field is set to "0", both the octet containing UL TCI state ID n2 and the octet containing power control parameter set ID n2 (or PL-RS ID n2) are not present. It means that a TCI codepoint with index n of a UL TCI field of the DCI points to one UL TCI state identified by UL TCI state ID n1, and the UL TCI state identified by UL TCI state ID n1 is associated with the power control parameter set identified by power control parameter set ID n1 (or the PL-RS identified by PL-RS ID n1).

FIG. 4(d) differs from FIG. 4(b) also in that power control parameter set ID n1 fields and power control parameter set ID n2 fields are added. The detailed descriptions of the MAC CE shown in FIG. 4(d) are omitted.

FIG. 4(c) shows that the MAC CE contains M octets. The number of M is variable depending on the value of N and the number of $DC_n$ and $UC_n$ fields being equal to 1 (or being equal to 0). When N is 7, M is maximally 49 (the number of $DC_n$ and $UC_n$ fields being equal to 1 is 16 or the number of $DC_n$ and $UC_n$ fields being equal to 0 is 0), and minimally 17 (the number of $DC_n$ and $UC_n$ fields being equal to 1 is 0 or the number of Cn fields being equal to 0 is 16).

FIG. 4(d) shows that the MAC CE contains P octets. When N is 7, P is maximally 49 (the number of $DC_n$ and $UC_n$ fields being equal to 1 is 16 or the number of $DC_n$ and $UC_n$ fields being equal to 0 is 0), and minimally 17 (the number of $DC_n$ and $UC_n$ fields being equal to 1 is 0 or the number of Cn fields being equal to 0 is 16). The number M shown in FIG. 4(*d*) is maximally 17 (the number of $DC_n$ fields being equal to 1 is 8 or the number of $DC_n$ fields being equal to 0 is 0) and minimally 9 (the number of $DC_n$ fields being equal to 1 is 0 or the number of $DC_n$ fields being equal to 0 is 8).

In the fourth embodiment described with reference to FIGS. 4*a* to 4*d*, 'D/U' field is not contained in the MAC CE. In this condition, the DL TCT state IDs and the UL TCT state IDs can be predetermined according to their positions in the MAC CE. According to the same principle, each of the 'D/U' fields associated with each TCI state ID (i.e. contained in the same octet with each TCI state ID) may be not included in any of the MAC CEs according to the first to the third embodiments.

According to a fifth embodiment, the 'D/U' fields contained in the TCI state activation/deactivation MAC CE according to the first embodiment are omitted. FIG. 5(*a*) illustrates a first example of the TCI state activation/deactivation MAC CE according to the fifth embodiment. When the 'D/U' fields are not contained in the MAC CE, whether a TCI state ID is a DL TCI state ID or a UL TCI state ID depends on the position (predetermined position) of the TCI state ID. The sequence (i.e. predetermined positions) of TCI state IDs of the MAC CE shown in FIG. 5(*a*) are: TCI codepoint 0 (including DL TCI state ID 0 and UL TCI state ID 0), TCI codepoint 1, . . . , TCI codepoint N (including DL TCI state ID N and UL TCI state ID N). FIG. 5(*a*) illustrates that, for each TCI codepoint n, DL TCI state ID n is positioned in front of UL TCI state ID n. It is also feasible that, for each TCI codepoint n, UL TCI state ID n is positioned in front of DL TCI state ID n. For simplicity, in the following descriptions of the embodiments in which the 'D/U' fields are omitted, DL TCI state ID n is positioned in front of UL TCI state ID n for each TCI codepoint n.

FIG. 5(*b*) illustrates a second example of the TCI state activation/deactivation MAC CE according to the fifth embodiment. The sequence (i.e. predetermined positions) of TCI state IDs are DL TCI state IDs 0 to N and UL TCI state IDs 0 to N. It is also obviously feasible that all of UL TCI state IDs 0 to N are positioned in front of all of DL TCI state IDs 0 to N.

The sequence (i.e. predetermined positions) of TCI state IDs of the TCI state activation/deactivation MAC CE according to the fifth embodiment are not limited to the sequences described with reference to FIGS. 5(*a*) and 5(*b*). When N is determined (for example, N=7), the TCI state IDs to be activated (updated) are fixed as DL TCI state IDs 0 to 7 and UL TCI state IDs 0 to 7. Therefore, the DL TCI state IDs 0 to 7 and the UL TCI state IDs 0 to 7 can be positioned in any sequence so long as the UE knows the sequence in advance.

In all of the above-described TCI state activation/deactivation MAC CE formats, both DL TCI state IDs and UL TCI state IDs are included in the MAC CE. However, DL TCI state IDs and UL TCI state IDs may not have to be activated (updated) simultaneously. To support activating (updating) only DL TCI state IDs or only UL TCI state IDs, a "D" field and a "U" field may be additionally contained in the MAC CE.

FIGS. 5(*c*) to 5(*f*) illustrates third examples of the TCI state activation/deactivation MAC CEs according to the fifth embodiment. Any of the MAC CEs shown in FIGS. 5(*c*) to 5(*f*) further contains a 1-bit "D" field and a 1-bit "U" field. The "D" field indicates whether the DL TCI state IDs are contained in the MAC CE: when "D" field is set to "1", DL TCI state IDs are contained in the MAC CE; and when "D" field is set to "0", DL TCI state IDs are not contained in the MAC CE. Similarly, the "U" field indicates whether the UL TCI state IDs are contained in the MAC CE: when "U" field is set to "1", UL TCI state IDs are contained in the MAC CE; and when "U" field is set to "0", UL TCI state IDs are not contained in the MAC CE. At least one of the "D" field and the "U" field is set to "1". That is, there are three possibilities: a first possibility is that both "D" field and "U" field are set to "1", which indicates that both DL TCI state IDs and UL TCI state IDs are contained in the MAC CE; a second possibility is that "D" field is set to "1" and "U" field is set to "0", which indicates that only DL TCI state IDs are contained in the MAC CE (UL TCI state IDs are not contained in the MAC CE); and a third possibility is that "U" field is set to "1" and "D" field is set to "0", which indicates that only UL TCI state IDs are contained in the MAC CE (DL TCI state IDs are not contained in the MAC CE).

FIG. 5(*c*) illustrates that both "D" field and "U" field are set to "1", in which the sequence (predetermined positions) of TCI state IDs are TCI codepoint 0 (including DL TCI state ID 0 and UL TCI state ID 0), TCI codepoint 1, . . . , TCI codepoint N (including DL TCI state ID N and UL TCI state ID N) (which is the same sequence as that of FIG. 5(*a*)).

FIG. 5(*d*) illustrates that both "D" field and "U" field are set to "1", in which the sequence (predetermined positions) of TCI state IDs are DL TCI state IDs 0 to N and UL TCI state IDs 0 to N (which is the same sequence as that of FIG. 5(*b*)).

FIG. 5(*e*) illustrates that "D" field is set to "1" and "U" field is set to "0". Only DL TCI state IDs 0 to N (suppose N=7) are contained in the MAC CE.

FIG. 5(*f*) illustrates that "D" field is set to "0" and "U" field is set to "1". Only UL TCI state IDs 0 to N (suppose N=7) are contained in the MAC CE.

FIGS. 6(*a*) to 6(*f*) illustrate the TCI state activation/deactivation MAC CEs according to a sixth embodiment. The MAC CEs shown in FIGS. 6(*a*) to 6(*f*) differ from those of FIGS. 5(*a*) to 5(*f*) in that a power control parameter set ID n (or a PL-RS ID n) is added just behind of UL TCI state ID n for the case when the power control parameters are not configured for UL TCI states by RRC signaling. The TCI state activation/deactivation MAC CEs shown in FIGS. 6(*a*) and 6(*b*) do not contain the "D" field and the "U" field, similar to the MAC CEs shown in FIGS. 5(*a*) and 5(*b*). The TCI state activation/deactivation MAC CEs shown in FIGS. 6(*c*) to 6(*f*) contain the "D" field and the "U" field, similar to the MAC CEs shown in FIGS. 5(*c*) to 5(*f*). Incidentally, because the MAC CE in FIG. 6(*e*) only contains DL TCI state ID n (which does not contain UL TCI state ID n), the MAC CE in FIG. 6(*e*) is the same as that in FIG. 5(*e*).

FIGS. 7(*a*) to 7(*d*) illustrate the TCI state activation/deactivation MAC CEs according to a seventh embodiment. The TCI state activation/deactivation MAC CEs shown in FIGS. 7(*a*) to 7(*d*) support multi-DCI based multi-TRP PDSCH and PUSCH transmissions, in which a 1-bit "CORESET Pool ID" field is added.

The MAC CEs shown in any of FIGS. 5(*a*) to 5(*f*) and 6(*a*) to 6(*f*) can be amended to include a 1-bit "CORESET Pool ID" field.

FIG. 7(*a*), which is amended from FIG. 5(*a*), contains a 1-bit "CORESET Pool ID" field in the first bit of octet 1. That is, the first bit of octet 1 of FIG. 5(*a*), which is reserved, is amended to be 1-bit "CORESET Pool ID" field in FIG. 7(*a*).

FIG. 7(*b*), which is amended from FIG. 5(*c*), contains a 1-bit "CORESET Pool ID" field in the first bit of octet 1. The first bit of octet 1 in FIG. 5(*c*) is the "D" field. In FIG. 7(*b*), an additional octet containing both the "D" field and the "U" field is added between octets 1 and 2 shown in FIG. 5(*c*), and named as octet 2 in FIG. 7(*b*). The 1-bit "D" field and the 1-bit "U" field can be included in any bits of octet 2. As shown in FIG. 7(*b*), the first six bits of octet 2 are reserved, while the last two bits are "D" field and "U" field. The TCI state activation/deactivation MAC CE shown in FIG. 7(*b*) has M octets. The value of M depends on the value of N (e.g. M=2*(N+1)+2). When N is 7, M is 18.

FIG. 7(*c*), which is amended from FIG. 6(*a*), contains a 1-bit "CORESET Pool ID" field in the first bit of octet 1. That is, the first bit of octet 1 of FIG. 6(*a*), which is reserved, is amended to be 1-bit "CORESET Pool ID" field in FIG. 7(*c*).

FIG. 7(*d*), which is amended from FIG. 6(*c*), contains a 1-bit "CORESET Pool ID" field in the first bit of octet 1. The first bit of octet 1 in FIG. 6(*c*) is the "D" field. In FIG. 7(*d*), an additional octet containing both the "D" field and the "U" field is added between octets 1 and 2 shown in FIG. 6(*c*), and named as octet 2 in FIG. 7(*d*). The 1-bit "D" field and the 1-bit "U" field can be included in any bits of octet 2. As shown in FIG. 7(*d*), the first six bits of octet 2 are reserved, while the last two bits are "D" field and "U" field. The TCI state activation/deactivation MAC CE shown in FIG. 7(*d*) has M octets. The value of M depends on the value of N (e.g. M=3*(N+1)+2). When N is 7, M is 26.

FIGS. 8(*a*) to 8(*h*) illustrate the TCI state activation/ deactivation MAC CEs according to an eighth embodiment. The TCI state activation/deactivation MAC CEs shown in FIGS. 8(*a*) to 8(*h*) support single-DCI based multi-TRP PDSCH and PUSCH transmissions, and they are amended from the MAC CEs shown in FIGS. 4(*a*) to 4(*d*) to further include the "D" field and the "U" field.

In each of the MAC CEs shown in FIGS. 8(*a*) to 8(*h*), an additional octet containing both the "D" field and the "U" field is added between octets 1 and 2 shown in FIGS. 4(*a*) to 4(*d*). The 1-bit "D" field and the 1-bit "U" field can be included in any bits of octet 2. As shown in any of FIGS. 8(*a*) to 8(*h*), the first six bits of octet 2 are reserved, while the last two bits are "D" field and "U" field.

FIG. 8(*a*) is amended from FIG. 4(*a*) by adding an octet (octet 2 in FIG. 8(*a*)) containing a "D" field set to "1" and a "U" field set to "1).

FIG. 8(*b*) is amended from FIG. 4(*b*) by adding an octet (octet 2 in FIG. 8(*b*)) containing a "D" field set to "1" and a "U" field set to "1".

FIG. 8(*c*) is amended from FIG. 4(*a*) or 4(*b*) by adding an octet (octet 2 in FIG. 8(*c*)) containing a "D" field set to "1" and a "U" field set to "0" (i.e. only DL TCI state IDs are contained).

FIG. 8(*d*) is amended from FIG. 4(*a*) or 4(*b*) by adding an octet (octet 2 in FIG. 8(*d*)) containing a "D" field set to "0" and a "U" field set to "1" (i.e. only UL TCI state IDs are contained).

FIG. 8(*e*) is amended from FIG. 4(*c*) by adding an octet (octet 2 in FIG. 8(*e*)) containing a "D" field set to "1" and a "U" field set to "1".

FIG. 8(*f*) is amended from FIG. 4(*d*) by adding an octet (octet 2 in FIG. 8(*f*)) containing a "D" field set to "1" and a "U" field set to "1".

FIG. 8(*g*) is amended from FIG. 4(*c*) or 4(*d*) by adding an octet (octet 2 in FIG. 8(*g*)) containing a "D" field set to "1" and a "U" field set to "0" (i.e. only DL TCI state IDs are contained).

FIG. 8(*h*) is amended from FIG. 4(*c*) or 4(*d*) by adding an octet (octet 2 in FIG. 8(*h*)) containing a "D" field set to "0"

and a "U" field set to "1" (i.e. only UL TCI state IDs and associated power control parameter set IDs (or PL-RS IDs) are contained).

As a whole, the TCI state activation/deactivation MAC CEs according to the first to the fourth embodiments can be used to simultaneously activate DL TCI states and UL TCI states. And the TCI state activation/deactivation MAC CEs according to the fifth to the eighth embodiments can be used to simultaneously activate DL TCI states and UL TCI states or to only activate DL TCI states (or UL TCI states).

The TCI state activation/deactivation MAC CE according to any of the first to the eighth embodiments only applies to the BWP identified by the BWP ID contained in the MAC CE. According to a ninth embodiment, the MAC CE can be extended to apply to all BWPs configured in all CCs belong to a CC list containing the CC indicated by the serving cell ID field contained in the MAC CE. The BWP ID field is ignored in this case.

Two CC lists (may be referred to "simultaneous DL TCI update lists") can be configured by existing parameters simultaneous TCI-UpdateList1-r16 and simultaneousTCI-UpdateList2-r16, respectively. Each of the two CC lists contains a plurality of CCs, in each of which up to 12 BWPs can be configured. If a UE receives a TCI state activation/ deactivation is MAC CE according to any of the first to the eighth embodiments, the DL TCI state IDs (if present) contained in the MAC CE are applied for all BWPs configured in all of the CCs contained in one simultaneous DL TCI update list containing the CC indicated by the serving cell ID field contained in the MAC CE. The BWP ID field is ignored in this case.

Two UL CC lists (may be referred to "simultaneous UL TCI update lists") can be configured in a similar way to the "simultaneous DL TCI update lists". Two existing UL CC lists ("simultaneous spatial relation update lists") are configured by existing parameters simultaneousSpatial-UpdatedList1-r16 and simultaneousSpatial-UpdatedList2-r16, respectively. These two existing UL CC lists are for the purpose of simultaneous spatial relation updating for SRS resources for multiple CCs.

The two UL CC lists ("simultaneous spatial relation update lists") configured by existing parameters simultaneousSpatial-UpdatedList1-r16 and simultaneousSpatial-UpdatedList2-r16, respectively, can be reused for the purpose of simultaneous UL TCI update as "simultaneous UL TCI update lists". Alternatively, additional two UL CC lists ("simultaneous UL TCI update lists") configured by new parameters simultaneousULTCI-UpdateList1-r17 and simultaneousULTCI-UpdateList2-r17, respectively, can be used for the purpose of simultaneous UL TCI update.

In both situations, when two simultaneous UL TCI update lists are configured, if a UE receives a TCI state activation/ deactivation MAC CE according to any of the first to the eighth embodiments, the UL TCI state IDs (if present) contained in the MAC CE are applied for all BWPs configured in all of the CCs contained in one simultaneous UL TCI update list containing the CC indicated by the serving cell ID field in the MAC CE. The BWP ID field is ignored in this case.

Note that the same CC may belong respectively to a simultaneous DL TCI update list and a simultaneous UL TCI update list. When a UE receives a TCI state activation/ deactivation MAC CE according to any of the first to the eighth embodiments, the DL TCI state IDs (if present) contained in the MAC CE are applied for all BWPs configured in all of the CCs contained in the simultaneous DL TCI update list containing the CC indicated by the serving cell ID field in the MAC CE, while the UL TCI state IDs (if present) and associated power control parameter sets or PL-RSs (if configured) identified by power control parameter set IDs or PL-RS IDs contained in the MAC CE are applied for all BWPs configured in all of the CCs contained in the simultaneous UL TCI update list containing the CC indicated by the serving cell ID field in the MAC CE.

It is feasible that one (instead of two) simultaneous DL TCI update list is configured. It is also feasible that one (instead of two) simultaneous UL TCI update list is configured.

According to any of the first to the eighth embodiments, one TCI state activation/deactivation MAC CE can be transmitted from the base station to the UE to simultaneously update the activation statuses of both DL TCI states and UL TCI states. Thus, the MAC CE signaling overhead and latency can be reduced. In addition, if power control related parameters (power control parameter set or PL-RS) for each UL TCI state are configured by RRC signaling, only DL TCI states and UL TCI states are indicated in the MAC CE. If power control related parameters (power control parameter set or PL-RS) for each UL TCI state are not configured by RRC signaling, the power control related parameters (power control parameter set or PL-RS) are also indicated for each UL TCI state in the MAC CE. The CORESET Pool ID field may be contained in the MAC CE to support multi-DCI based multi-TRP PDSCH and PUSCH transmissions. Single-DCI based multi-TRP PDSCH and PUSCH transmission can also be supported by one MAC CE as illustrated in any of FIGS. 4(*a*) to 4(*d*) and 8(*a*) to 8(*h*). When the "D" field and the "U" field are contained in the one MAC CE, the one MAC CE can activate (update) only the DL TCI states (or only the UL TCI states). Moreover, simultaneous UL TCI state activation and/or simultaneous DL TCI state activation across multiple CCs are also supported by configuring simultaneous UL TCI update list(s) and/or simultaneous DL TCI update list(s).

FIG. 9 is a schematic flow chart diagram illustrating an embodiment of a method 600 according to the present application. In some embodiments, the method 900 is performed by an apparatus, such as a base unit. In certain embodiments, the method 600 may be performed by a processor executing program code, for example, a microcontroller, a microprocessor, a CPU, a GPU, an auxiliary processing unit, a FPGA, or the like.

The method 900 may include 902 transmitting one MAC CE that can simultaneously activate DL TCI states and UL TCI states, wherein the one MAC CE includes TCI state IDs that can be indicated as DL TCI state IDs identifying the DL TCI states to be activated and/or UL TCI state IDs identifying the UL TCI states to be activated.

In the method 900, the one MAC CE may further include a 'D/U' field associated with each TCI state ID to indicate whether the TCI state ID is a DL TCI state ID or a UL TCI state ID, for example, as shown in FIGS. 1(*a*) to 1(*c*), 2(*a*) to 2(*c*), 3(*a*) to 3(*b*). Alternatively, whether a TCI state ID is a DL TCI state ID or a UL TCI state ID depends on the position of the TCI state ID in the one MAC CE (in other words, 'D/U' field is not included), for example, as shown in FIGS. 4(*a*) to 4(*d*), 5(*a*) to 5(*f*), 6(*a*) to 6(*f*), 7(*a*) to 7(*d*), 8(*a*) to 8(*h*).

In the method 900, the one MAC CE may further include a power control parameter set ID or a PL-RS ID identifying a power control parameter set or a PL-RS associated with each UL TCI state identified by a UL TCI state ID, for example, as shown in FIGS. 2(*a*) to 2(*c*), 3(*b*), 4(*c*), 4(*d*), 6(*a*) to 6(*d*), 6(*f*), 7(*c*), 7(*d*), 8(*e*), 8(*f*), 8(*h*).

In the method 900, the one MAC CE may further include a CORESET Pool ID field to indicate a CORESETPoolIndex value, and the DL TCI states and/or the UL TCI states activated by the one MAC CE are pointed to by a TCI field of a DCI transmitted from a CORESET configured with the CORESETPoolIndex value. Examples are shown in FIGS. 3(*a*), 3(*b*), 7(*a*) to 7(*d*).

In the method 900, two DL TCI states identified by two DL TCI state IDs or two UL TCI states identified by two UL TCI state IDs can be pointed to by one TCI field of a DCI. Examples are shown in FIGS. 4(*a*) to 4(*d*), 8(*a*) to 8(*h*).

In the method 900, the one MAC CE further includes a 'D' field and a 'U' field, the 'D' field indicates whether DL TCI state IDs are included in the one MAC CE, and the 'U' field indicates whether UL TCI state IDs are included in the one MAC CE. Examples are shown in FIGS. 5(*c*) to 5(*f*), 6(*c*) to 6(*f*), 7(*b*), 7(*d*), 8(*a*) to 8(*h*).

The method 900 may further include transmitting a configuration of at least one simultaneous UL TCI update list for a UE by RRC signaling. In this condition, for the UE, the UL TCI states identified by UL TCI state IDs and/or the associated power control parameter sets or PL-RSs are applied to for all BWPs configured in all CCs in one of the at least one simultaneous UL TCI update list containing the CC indicated by a serving cell ID field contained in the one MAC CE.

Figure 10:
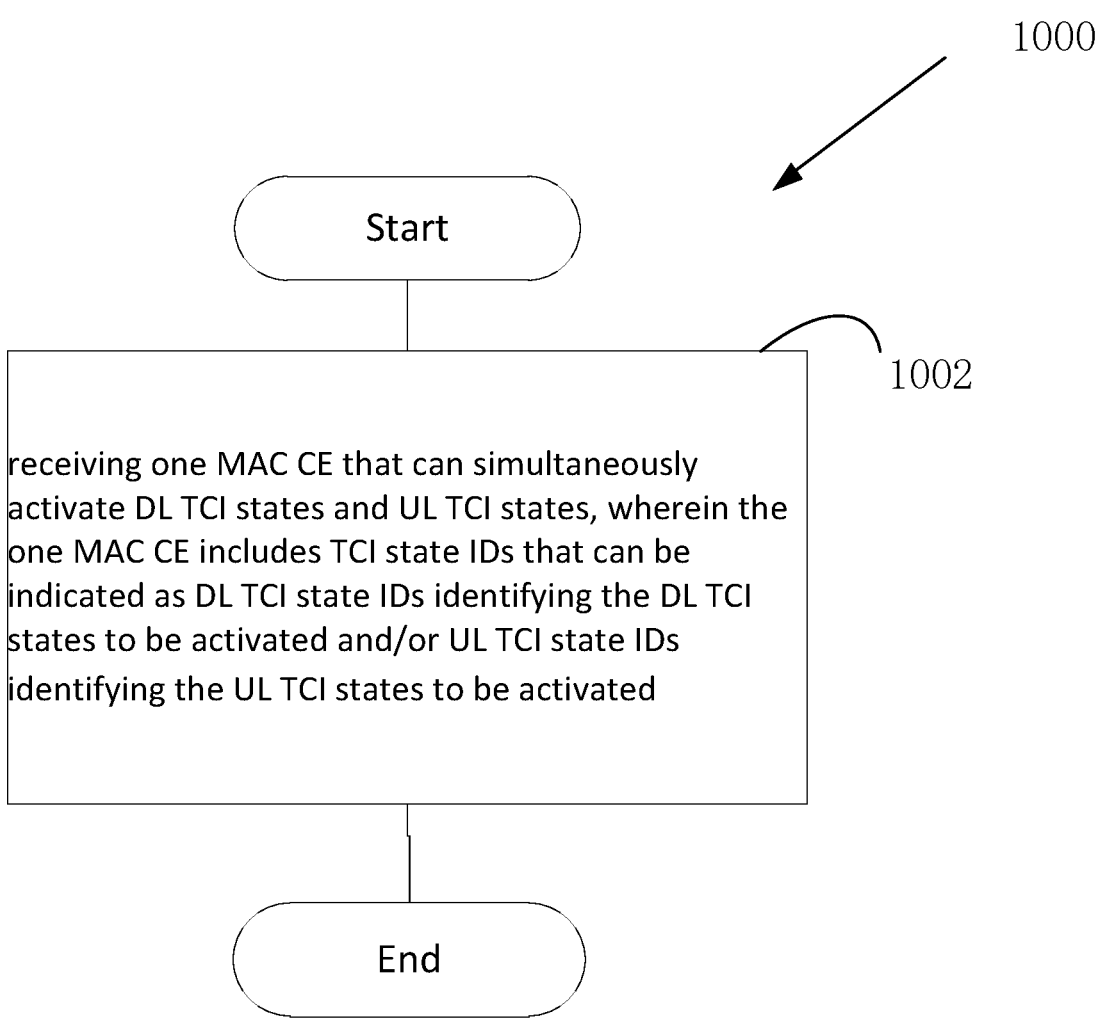
FIG. 10 is a schematic flow chart diagram illustrating a further embodiment of a method.

FIG. 10 is a schematic flow chart diagram illustrating an embodiment of a method 1000 according to the present application. In some embodiments, the method 1000 is performed by an apparatus, such as a remote unit. In certain embodiments, the method 1000 may be performed by a processor executing program code, for example, a microcontroller, a is microprocessor, a CPU, a GPU, an auxiliary processing unit, a FPGA, or the like.

The method 1000 may include 1002 receiving one MAC CE that can simultaneously activate DL TCI states and UL TCI states, wherein the one MAC CE includes TCI state IDs that can be indicated as DL TCI state IDs identifying the DL TCI states to be activated and/or UL TCI state IDs identifying the UL TCI states to be activated.

In the method 1000, the one MAC CE may further include a 'D/U' field associated with each TCI state ID to indicate whether the TCI state ID is a DL TCI state ID or a UL TCI state ID, for example, as shown in FIGS. 1(*a*) to 1(*c*), 2(*a*) to 2(*c*), 3(*a*) to 3(*b*). Alternatively, whether a TCI state ID is a DL TCI state ID or a UL TCI state ID depends on the position of the TCI state ID in the one MAC CE (in other words, 'D/U' field is not included), for example, as shown in FIGS. 4(*a*) to 4(*d*), 5(*a*) to 5(*f*), 6(*a*) to 6(*f*), 7(*a*) to 7(*d*), 8(*a*) to 8(*h*).

In the method 1000, the one MAC CE may further include a power control parameter set ID or a PL-RS ID identifying a power control parameter set or a PL-RS associated with each UL TCI state identified by a UL TCI state ID, for example, as shown in FIGS. 2(*a*) to 2(*c*), 3(*b*), 4(*c*), 4(*d*), 6(*a*) to 6(*d*), 6(*f*), 7(*c*), 7(*d*), 8(*e*), 8(*f*), 8(*h*).

In the method 1000, the one MAC CE may further include a CORESET Pool ID field to indicate a CORESETPoolIndex value, and the DL TCI states and/or the UL TCI states activated by the one MAC CE are pointed to by a TCI field of a DCI transmitted from a CORESET configured with the CORESETPoolIndex value. Examples are shown in FIGS. 3(*a*), 3(*b*), 7(*a*) to 7(*d*).

In the method 1000, two DL TCI states identified by two DL TCI state IDs or two UL TCI states identified by two UL TCI state IDs can be pointed to by one TCI field of a DCI. Examples are shown in FIGS. 4(*a*) to 4(*d*), 8(*a*) to 8(*h*).

In the method 1000, the one MAC CE further includes a 'D' field and a 'U' field, the 'D' field indicates whether DL TCI state IDs are included in the one MAC CE, and the 'U' field indicates whether UL TCI state IDs are included in the one MAC CE. Examples are shown in FIGS. 5(c) to 5(f), 6(c) to 6(f), 7(b), 7(d), 8(a) to 8(h)

The method 1000 may further include receiving a configuration that at least one simultaneous UL TCI update list for the remote unit by RRC signaling. In this condition, for the remote unit, the UL TCI states identified by UL TCI state IDs and/or the associated power control parameter sets or PL-RSs are applied to for all BWPs configured in all CCs in one of the at least one simultaneous UL TCI update list containing the CC indicated by a serving cell ID field contained in the one MAC CE.

Figure 11:
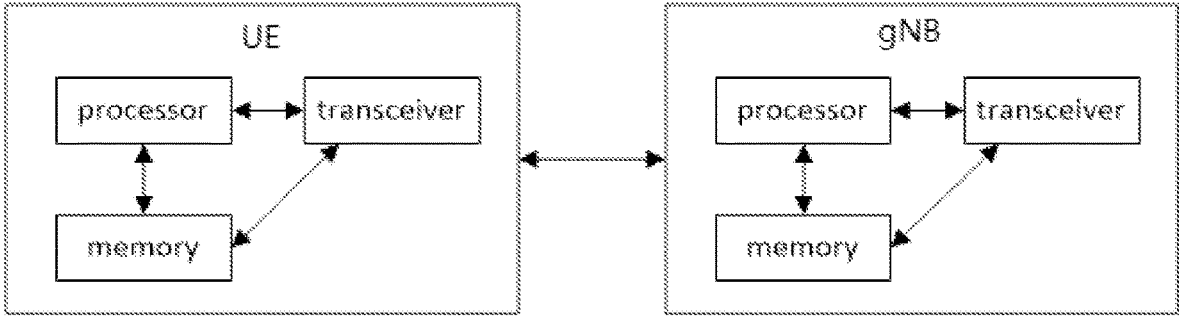
FIG. 11 is a schematic block diagram illustrating apparatuses according to one embodiment.

FIG. 11 is a schematic block diagram illustrating apparatuses according to one embodiment.

Referring to FIG. 11, the UE (i.e. the remote unit) includes a processor, a memory, and a transceiver. The processor implements a function, a process, and/or a method which are proposed in FIG. 10. In particular, the remote unit comprises a receiver, wherein the receiver receives one MAC CE that can simultaneously activate DL TCI states and UL TCI states, wherein the one MAC CE includes TCI state IDs that can be indicated as DL TCI state IDs identifying the DL TCI states to be activated and/or UL TCI state IDs identifying the UL TCI states to be activated.

The one MAC CE may further include a 'D/U' field associated with each TCI state ID to indicate whether the TCI state ID is a DL TCI state ID or a UL TCI state ID, for example, as shown in FIGS. 1(a) to 1(c), 2(a) to 2(c), 3(a) to 3(b). Alternatively, whether a TCI state ID is a DL TCI state ID or a UL TCI state ID depends on the position of the TCI state ID in the one MAC CE (in other words, 'D/U' field is not included), for example, as shown in FIGS. 4(a) to 4(d), 5(a) to 5(f), 6(a) to 6(f), 7(a) to 7(d), 8(a) to 8(h).

The one MAC CE may further include a power control parameter set ID or a PL-RS ID identifying a power control parameter set or a PL-RS associated with each UL TCI state identified by a UL TCI state ID, for example, as shown in FIGS. 2(a) to 2(c), 3(b), 4(c), 4(d), 6(a) to 6(d), 6(f), 7(c), 7(d), 8(e), 8(f), 8(h).

The one MAC CE may further include a CORESET Pool ID field to indicate a CORESETPoolIndex value, and the DL TCI states and/or the UL TCI states activated by the one MAC CE are pointed to by a TCI field of a DCI transmitted from a CORESET configured with the CORESETPoolIndex value. Examples are shown in FIGS. 3(a), 3(b), 7(a) to 7(d).

Two DL TCI states identified by two DL TCI state IDs or two UL TCI states identified by two UL TCI state IDs can be pointed to by one TCI field of a DCI. Examples are shown in FIGS. 4(a) to 4(d), 8(a) to 8(h).

The one MAC CE further includes a 'D' field and a 'U' field, the 'D' field indicates whether DL TCI state IDs are included in the one MAC CE, and the 'U' field indicates whether UL TCI state IDs are included in the one MAC CE. Examples are shown in FIGS. 5(c) to 5(f), 6(c) to 6(f), 7(b), 7(d), 8(a) to 8(h).

In particular, the receiver may further receive a configuration of at least one simultaneous UL TCI update list for the remote unit by RRC signaling. In this condition, for the remote unit, the UL TCI states identified by UL TCI state IDs and/or the associated power control parameter sets or PL-RSs are applied to for all BWPs configured in all CCs in one of the at least one simultaneous UL TCI update list containing the CC indicated by a serving cell ID field contained in the one MAC CE.

The gNB (i.e. base unit) includes a processor, a memory, and a transceiver. The processors implement a function, a process, and/or a method which are proposed in FIG. 9. In particular, the base unit includes a transmitter, wherein the transmitter transmits one MAC CE that can simultaneously activate DL TCI states and UL TCI states, wherein the one MAC CE includes TCI state IDs that can be indicated as DL TCI state IDs identifying the DL TCI states to be activated and/or UL TCI state IDs identifying the UL TCI states to be activated.

The one MAC CE may further include a 'D/U' field associated with each TCI state ID to indicate whether the TCI state ID is a DL TCI state ID or a UL TCI state ID, for example, as shown in FIGS. 1(a) to 1(c), 2(a) to 2(c), 3(a) to 3(b). Alternatively, whether a TCI state ID is a DL TCI state ID or a UL TCI state ID depends on the position of the TCI state ID in the one MAC CE (in other words, 'D/U' field is not included), for example, as shown in FIGS. 4(a) to 4(d), 5(a) to 5(f), 6(a) to 6(f), 7(a) to 7(d), 8(a) to 8(h).

The one MAC CE may further include a power control parameter set ID or a PL-RS ID identifying a power control parameter set or a PL-RS associated with each UL TCI state identified by a UL TCI state ID, for example, as shown in FIGS. 2(a) to 2(c), 3(b), 4(c), 4(d), 6(a) to 6(d), 6(f), 7(c), 7(d), 8(e), 8(f), 8(h).

The one MAC CE may further include a CORESET Pool ID field to indicate a CORESETPoolIndex value, and the DL TCI states and/or the UL TCI states activated by the one MAC CE are pointed to by a TCI field of a DCI transmitted from a CORESET configured with the CORESETPoolIndex value. Examples are shown in FIGS. 3(a), 3(b), 7(a) to 7(d).

Two DL TCI states identified by two DL TCI state IDs or two UL TCI states identified by two UL TCI state IDs can be pointed to by one TCI field of a DCI. Examples are shown in FIGS. 4(a) to 4(d), 8(a) to 8(h).

The one MAC CE further includes a 'D' field and a 'U' field, the 'D' field indicates whether DL TCI state IDs are included in the one MAC CE, and the 'U' field indicates whether UL TCI state IDs are included in the one MAC CE. Examples are shown in FIGS. 5(c) to 5(f), 6(c) to 6(f), 7(b), 7(d), 8(a) to 8(h).

The transmitter may further transmit a configuration of at least one simultaneous UL TCI update list for a UE by RRC signaling. In this condition, for the UE, the UL TCI states identified by UL TCI state IDs and/or the associated power control parameter sets or PL-RSs are applied to for all BWPs configured in all CCs in one of the at least one simultaneous UL TCI update list containing the CC indicated by a serving cell ID field contained in the one MAC CE.

Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a base unit, the method comprising:
   transmitting one medium access control control element (MAC CE) that simultaneously activates downlink (DL) transmission configuration indication (TCI) states and uplink (UL) TCI states,
   wherein the one MAC CE includes:
      TCI state IDs as DL TCI state IDs identifying the DL TCI states to be activated and UL TCI state IDs identifying the UL TCI states to be activated,
         wherein two TCI state IDs having a same index are positioned in adjacent octets of the one MAC CE and two TCI state IDs having difference indexes are positioned in sequential octets, and
      downlink/uplink fields (D/U) fields associated with each TCI state ID to indicate whether the TCI state ID is a DL TCI state ID or a UL TCI state ID.

2. The method of claim 1, wherein the one MAC CE further includes a power control parameter set ID or a Path Loss Reference Signal (PL-RS) ID identifying a power control parameter set or a PL-RS associated with each UL TCI state identified by the UL TCI state ID.

3. The method of claim 1, wherein,
   the one MAC CE includes a CORESET Pool ID field to indicate a CORESETPoolIndex value, and
   the DL TCI states and/or the UL TCI states activated by the one MAC CE are pointed to by a TCI field of a DCI transmitted from a CORESET configured with the CORESETPoolIndex value.

4. The method of claim 1, wherein two DL TCI states identified by two DL TCI state IDs or two UL TCI states identified by two UL TCI state IDs are pointed to by one TCI field of a DCI.

5. The method of claim 4, wherein the UL TCI states identified by the UL TCI state IDs, associated power control parameter sets, or Path Loss Reference Signals (PL-RSs) are applied for all bandwidth partitions (BWPs) configured in all component carriers (CCs) in one of the at least one simultaneous UL TCI update list containing a common carrier (CC) indicated by a serving cell ID field contained in the one MAC CE.

6. The method of claim 1, further comprising: transmitting a configuration of at least one simultaneous UL TCI update list for a user equipment (UE) by radio resource control (RRC) signaling.

7. The method of claim 1, wherein the one MAC CE further includes a 'D' field and a 'U' field, wherein the 'D' field indicates whether DL TCI state IDs are included in the one MAC CE, and wherein the 'U' field indicates whether UL TCI state IDs are included in the one MAC CE.

8. The method of claim 1, wherein a TCI state ID is a DL TCI state ID or a UL TCI state ID based on a position of the TCI state ID in the one MAC CE.

9. A base unit for wireless communication, comprising:
   at least one memory; and
   at least one processor coupled with the at least one memory and configured to cause the base unit to:
   transmit one medium access control control element (MAC CE) that simultaneously activates downlink (DL) transmission configuration indication (TCI) states and uplink (UL) TCI states,
      wherein the one MAC CE includes:
         TCI state IDs as DL TCI state IDs identifying the DL TCI states to be activated and UL TCI state IDs identifying the UL TCI states to be activated,
            wherein two TCI state IDs having a same index are positioned in adjacent octets of the one MAC CE and two TCI state IDs having difference indexes are positioned in sequential octets, and
         downlink/uplink fields (D/U) fields associated with each TCI state ID to indicate whether the TCI state ID is a DL TCI state ID or a UL TCI state ID.

10. The base unit of claim 9, wherein the one MAC CE further includes a power control parameter set ID or a Path Loss Reference Signal (PL-RS) ID identifying a power control parameter set or a PL-RS associated with each UL TCI state identified by the UL TCI state ID.

11. The base unit of claim 9, wherein,
   the one MAC CE includes a CORESET Pool ID field to indicate a CORESETPoolIndex value, and
   the DL TCI states and/or the UL TCI states activated by the one MAC CE are pointed to by a TCI field of a DCI transmitted from a CORESET configured with the CORESETPoolIndex value.

12. The base unit of claim 9, wherein two DL TCI states identified by two DL TCI state IDs or two UL TCI states identified by two UL TCI state ID are pointed to by one TCI field of a DCI.

13. The base unit of claim 9, wherein the at least one processor is further configured to cause the base unit to: transmit a configuration of at least one simultaneous UL TCI update list for a user equipment (UE) by radio resource control (RRC) signaling.

14. The base unit of claim 13, wherein the UL TCI states identified by the UL TCI state IDs, associated power control parameter sets, or Path Loss Reference Signals (PL-RSs) are applied for all bandwidth partitions (BWPs) configured in all component carriers (CCs) in one of the at least one simultaneous UL TCI update list containing a common carrier (CC) indicated by a serving cell ID field contained in the one MAC CE.

15. The base unit of claim 9, wherein the one MAC CE further includes a 'D' field and a 'U' field, wherein the 'D' field indicates whether DL TCI state IDs are included in the one MAC CE, and wherein the 'U' field indicates whether UL TCI state IDs are included in the one MAC CE.

16. The base unit of claim 9, wherein a TCI state ID is a DL TCI state ID or a UL TCI state ID based on a position of the TCI state ID in the one MAC CE.

17. A remote unit for wireless communication, comprising:

at least one memory; and at least one processor coupled with the at least one memory and configured to cause the remote unit to:

receive one medium access control control element (MAC CE) that simultaneously activates downlink (DL) transmission configuration indication (TCI) states and uplink (UL) TCI states at the remote unit, wherein the one MAC CE includes:

TCI state IDs as DL TCI state IDs identifying the DL TCI states to be activated and UL TCI state IDs identifying the UL TCI states to be activated, wherein two TCI state IDs having a same index are positioned in adjacent octets of the one MAC CE and two TCI state IDs having difference indexes are positioned in sequential octets, and downlink/uplink fields (D/U) fields associated with each TCI state ID to indicate whether the TCI state ID is a DL TCI state ID or a UL TCI state ID.

\*   \*   \*   \*   \*